(12) United States Patent
Miyamoto

(10) Patent No.: US 8,175,496 B2
(45) Date of Patent: May 8, 2012

(54) ENDLESS BELT, PRODUCTION METHOD THEREOF AND IMAGE FORMING APPARATUS

(75) Inventor: Tsuyoshi Miyamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1080 days.

(21) Appl. No.: 12/053,960

(22) Filed: Mar. 24, 2008

(65) Prior Publication Data

US 2009/0062505 A1 Mar. 5, 2009

(30) Foreign Application Priority Data

Aug. 28, 2007 (JP) ................................ 2007-220942

(51) Int. Cl.
G03G 15/00 (2006.01)

(52) U.S. Cl. ......... 399/162; 399/303; 399/308; 399/329

(58) Field of Classification Search ................. 528/322; 427/569, 576; 399/162–165, 303, 308, 312, 399/313, 329
See application file for complete search history.

(56) References Cited

U.S. PATENT DOCUMENTS

| | | | |
|---|---|---|---|
| 4,804,576 A * | 2/1989 | Kuge et al. | 428/216 |
| 5,774,771 A * | 6/1998 | Kukimoto et al. | 430/45.54 |

FOREIGN PATENT DOCUMENTS

| | | |
|---|---|---|
| JP | A-62-206567 | 9/1987 |
| JP | A-05-200904 | 8/1993 |
| JP | A-06-149083 | 5/1994 |
| JP | A-06-228335 | 8/1994 |
| JP | A-06-258960 | 9/1994 |
| JP | A-09-305038 | 11/1997 |
| JP | B2-2784141 | 5/1998 |
| JP | A-10-240020 | 9/1998 |
| JP | B2-2903972 | 3/1999 |
| JP | A-2003-131463 | 5/2003 |
| JP | A-2004-163578 | 6/2004 |
| JP | A-2007-153510 | 6/2007 |

OTHER PUBLICATIONS

Machine Translation of JP 2007-153510, Jun. 2007.*
Japanese Office Action issued on Nov. 17, 2009 in Japanese Patent Application No. 2007-220942 (with translation).

* cited by examiner

Primary Examiner — David Porta
Assistant Examiner — Benjamin Schmitt
(74) Attorney, Agent, or Firm — Oliff & Berridge, PLC

(57) ABSTRACT

The present invention provides an endless belt superior in peelability even under a low temperature and low humidity environment. An endless belt includes: a first region and a second region, which contain a polyimide-based resin, a contact angle to water of an outer peripheral surface of each of the first region and the second region differing from each other, and a ratio of a sum total of an area of the first region and a sum total of an area of the second region being in the range of about 80:20, to about 20:80.

17 Claims, 7 Drawing Sheets

ENDLESS BELT, PRODUCTION METHOD THEREOF AND IMAGE FORMING APPARATUS

CROSS-REFERENCE TO RELATED APPLICATION

This application is based on and claims priority under 35 USC 119 from Japanese Patent Application No. 2007-220942 filed Aug. 28, 2007.

BACKGROUND

1. Technical Field

The invention relates to an endless belt, a method of production thereof, and an image forming apparatus.

2. Related Art

In an image forming apparatus by means of an electrophotographic process, an image is formed as follows. First, a surface of the latent image holding member comprising a photoconductive photoreceptor made of an inorganic material or an organic material is charged. Thereafter, laser light obtained by modifying an image signal is irradiated on a surface of the latent image holding member surface to form an electrostatic latent image. Subsequently, a charged toner is used to develop the electrostatic latent image to form a toner image. Finally, the toner image on a surface of the latent image holding member is transferred directly or through an intermediate transfer body onto a recording medium such as paper, followed by fixing to form the image.

Here, as an intermediate transfer belt that is used in an image forming apparatus that adopts a process where a toner image on a photoreceptor is first transferred onto an intermediate transfer body, followed by secondarily transferring a toner image on the intermediate transfer body onto a recording medium such as paper (so-called intermediate transfer process), for instance, a belt that uses polycarbonate (PC), a belt that uses polyvinylidene fluoride (PDDF), a semiconductive ($10^5$ to $10^{11}$ Ωcm) endless belt in which in a thermoplastic resin such as a blend of polyalkylene terephthalate, an ethylene-tetrafluoroethylene copolymer (ETFE) and PC, a conductive agent such as carbon black or the like is dispersed, or a reinforcement member-containing elastic belt in which a woven fabric made of polyester or the like and an elastic material such as nitrile butadiene rubber (NBR) or the like are laminated are proposed.

Furthermore, recently, a method where the intermediate transfer body is heated to fix a toner image on a recording medium, more specifically, an intermediate transfer/fixing process has also been proposed.

An intermediate transfer/fixing process is a process where, after a toner image on a photoreceptor is secondarily transferred through an intermediate transfer body on a recording medium, the intermediate transfer body is directly or indirectly heated to fix the toner image on the recording medium in contact with the intermediate transfer body. The process has an advantage in that, in comparison with a conventional device where an intermediate transfer unit and a fixing unit are separated, a device may be miniaturized and the cost may be reduced.

Here, a belt material that is used in the intermediate transfer/fixing process is required to have the mechanical strength capable of withstanding stress at the time of driving and simultaneously to be capable of withstanding heat close to 200° C., which is provided at the time of fixing.

On the other hand, in a fixing, process that is carried out at the final step of printing/copying of an image forming apparatus such as an electrophotographic copier, a facsimile, a printer and so on, it is necessary that a toner on a surface of a recording medium such as transfer paper or the like is heated and melted to fix the toner on the surface of the recording medium. In such a fixing process, in place of a conventional hot roll (roller) fixing process, a belt fixing process superior in shortening start-up time is widely in use.

A belt fixing process is a process where, through a film-shaped endless belt, a heater heats a toner on a surface of a recording medium. In the process, a fixing belt and a rubber roll are brought into contact under pressure to form a contact portion, a recording medium on which a toner image is formed is inserted in the contact portion of the fixing belt and the rubber roll and heated by a heater, and, thereby, the toner image is melted and fixed on a surface of the recording medium.

According to such a belt fixing process, since, the heater directly heats only through a thin film-shaped belt, the heated portion reaches a predetermined temperature in a short time and thereby the waiting time after a power source is turned on can be cut back significantly. Furthermore, another advantage is that since only the necessary portion is heated, power consumption is small.

As a resin material that may be preferably used in various applications and simultaneously satisfies a variety of characteristics such as the heat resistance, endurance, mechanical strength, chemical resistance and electrical stability that are required over the entirety of belt members such as a transfer belt, an intermediate transfer belt and a fixing belt used for an electrophotographic apparatus and has various kinds of functions, polyimide-based resins such as polyimide and polyamideimide are most superior.

Such a polyimide-based resin is characterized in having an imide ring structure in a molecular structure thereof, and, without having a large side chain structure, having a main chain structure such as an imide ring or a phenylene group that is high in rigidity. Accordingly, the polyimide-based resin is inhibited from freely rotating in a resin molecular chain and, since there is a strong interaction force between molecular chains, high mechanical strength and endurance are realized. Furthermore, the polyimide based-resin does not have an ionic polar group, and raw materials thereof may be readily purified; accordingly, less impurities are contained and electrical stability is high.

However, when an endless belt made of the polyimide-based material such as the polyimide or polyamideimide is used as a transfer belt, a fixing belt, a transfer and delivery belt or an intermediate transfer belt, a process where a recording medium such as paper or the like is held and released on a surface portion is carried out repeatedly and continuously. Accordingly, the endless belt is required to unfailingly be released from the recording medium in the holding and releasing process.

Further, in a fixing belt, a method where, in order to secure releasability, a releasing layer low in the surface energy is disposed on a surface of a belt material to secure peelability is proposed.

SUMMARY

According to an aspect of the invention, there is provided an endless belt, comprising: a first region and a second region, each of which contain a polyimide-based resin, a contact angle to water of an outer peripheral surface of each of the first region and the second region differing from each other, a ratio of a sum total of an area of the first region and a sum total of an area of the second region being in the range of about 80:20, to about 20:80.

BRIEF DESCRIPTION OF THE DRAWINGS

Exemplary embodiments of the present invention will be described in detail based on the following figures, wherein.

DETAILED DESCRIPTION

Figure 1A:
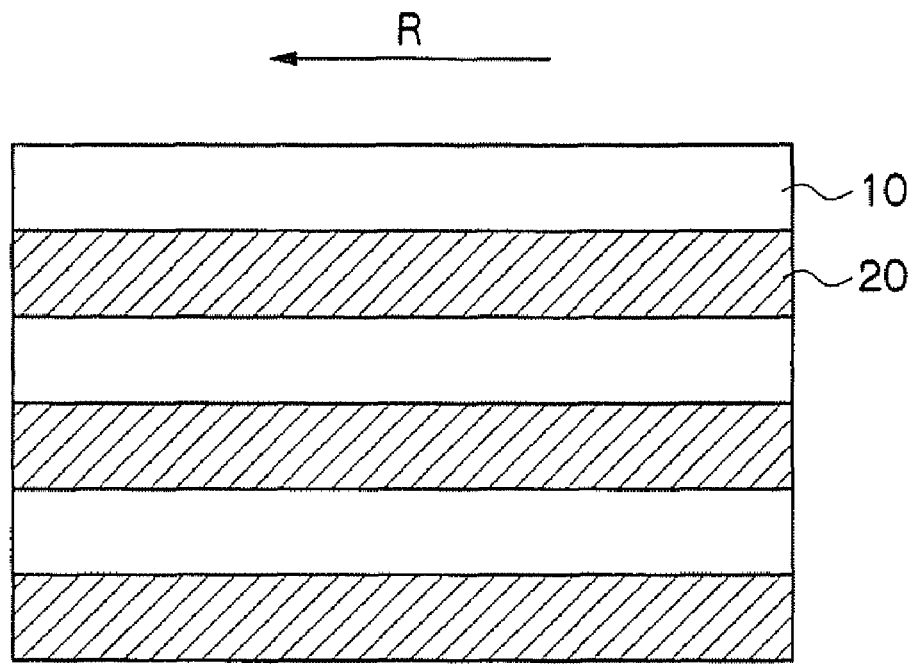
FIGS. 1A and 1B are rough schematic diagrams each showing an example of an arrangement and a shape in a first region and a second region in an outer peripheral surface of an endless belt of the present exemplary embodiment.

Exemplary embodiments of the invention are described in detail hereinafter. The above-described problems are solved by the invention as described below.

More specifically, the invention in accordance with a first aspect of the invention is an endless belt, comprising: a first region and a second region, each of which contain a polyimide-based resin, a contact angle to water of an outer peripheral surface of each of the first region and the second region differing from each other, a ratio of a sum total of an area of the first region and a sum total of an area of the second region being in the range of about 80:20, to about 20:80.

The invention in accordance with a second aspect is the endless belt of the first aspect, wherein an absolute value of a difference of the contact angle to water of the first region and the contact angle to water of the second region is about 10° or more.

The invention in accordance with a third aspect is the endless belt of the first aspect, wherein an absolute value of a difference of the contact angle to water of the first region and the contact angle to water of the second region is about 20° or more.

The invention in accordance with a fourth aspect is the endless belt of the first aspect, wherein a ratio of the sum total of the area of the first region and the sum total of the area of the second region is in the range of about 70:30 to about 30:70.

The invention in accordance with a fifth aspect is the endless belt of the first aspect, wherein a ratio of the sum total of the area of the first region and the sum total of the area of the second region is in the range of about 60:40 to about 40:60.

The invention in accordance with a sixth aspect is the endless belt of the first aspect, wherein a ratio of a ten-point average roughness Rz of the second region with respect to a ten-point average roughness Rz of the first region is in the range of from about 0.8 to about 1.2.

The invention in accordance with a seventh aspect is the endless belt of the first aspect, wherein an imidization rate of the first region and an imidization rate of the second region satisfy formula (1) below:

$$|\text{imidization rate of the first region} - \text{imidization rate of the second region}| \geq 20 \quad \text{Formula (1)}$$

wherein, in formula (1), the imidization rate means a value shown by formula (2) below, $$\text{imidization rate} = \{(Abs(C=O))/(Abs(Ar))\}/k \times 100 \quad \text{Formula (2)}$$

wherein, in formula (2), Abs (C=O) expresses the absorbance of a peak appearing at 1700 cm$^{-1}$ to 1850 cm$^{-1}$ and caused by a carbonyl group derived from an imide group that constitutes the polyimide-based resin, Abs (Ar) expresses the absorbance of a peak appearing at 1400 cm$^{-1}$ to 1600 cm$^{-1}$ and caused by a benzene ring that constitutes the polyimide-based resin, and k expresses a constant value (a value of Abs(C=O)/Abs(Ar) of a film obtained by burning a polyimide resin film to be used at 400° C.).

The invention in accordance with a eighth aspect is a method of producing an endless belt, comprising: forming a coated film by coating a polyimide-based composition on a surface of a tubular-shaped support; forming a tubular-shaped base material by burning the coated film, after drying of the coated film; and carrying out surface treating by applying at least one surface treatment selected from the group consisting of a hydrolysis treatment, a plasma treatment, a corona discharge treatment and an ultraviolet-irradiation treatment to a specified region of an outer peripheral surface that occupies an area ratio of about 20% to 80% of a total area of the outer peripheral surface of the base material.

The invention in accordance with a ninth aspect is the method of producing an endless belt of the eighth aspect, wherein, after the forming of the base material, a region other than the specified region of the outer peripheral surface is masked, followed by applying the hydrolysis treatment as the surface treatment.

The invention in accordance with a tenth aspect is the method of producing an endless belt of the eighth aspect or the ninth aspect, wherein the hydrolysis treatment includes an alkaline solution treatment where an alkaline solution is brought into contact with the specified region.

The invention in accordance with a eleventh aspect is the producing method of an endless belt of the tenth aspect, further comprising: contacting an acidic solution with the specified region where the hydrolysis treatment utilizing the alkaline solution treatment is applied.

The invention in accordance with a twelfth aspect is an image forming apparatus, comprising: one or more endless belts mounted thereon, wherein at least one of the one or more endless belts is the endless belt of one selected from the group of the first aspect to the seventh aspect.

The invention in accordance with a thirteenth aspect is the image forming apparatus of the twelfth aspect, wherein at least one of the one or more endless belts is an intermediate transfer belt comprising the endless belt.

The invention in accordance with a fourteenth aspect is the image forming apparatus of the twelfth aspect, wherein at least one of the one or more endless belts is a transfer delivery belt comprising the endless belt.

The invention in accordance with a fifteenth aspect is the image forming apparatus of the twelfth aspect, wherein at least one of the one or more endless belts is a fixing belt comprising the endless belt.

(Endless Belt)

An endless belt of the exemplary embodiment contains a polyimide-based resin and has a first region and a second region, which are different in a contact angle of an outer peripheral surface to water, a ratio of a sum total of an area of the first region and a sum total of an area of the second region being in the range of 80:20 or about 80:20 to 20:80 or about 20:80.

Accordingly, on an outer peripheral surface of an endless belt of the exemplary embodiment, a region that is relatively high in a contact angle to water and low in the adhesive property to a recording medium and a region that is relatively low in a contact angle to water and high in the adhesive property to a recording medium are present, and a boundary line of the two regions works as peel starting point. Accordingly, in comparison with an endless belt of which outer peripheral surface is made of a single region (a single region where a contact angle to water is same over an entire surface), even under low temperature and low humidity conditions, excellent peelability to a recording medium is exerted.

Furthermore, usually, when a recording medium is peeled off the endless belt, an endless belt of a portion that comes into contact with the recording medium is deformed. In addition to the above, in an endless belt of the exemplary embodiment, the adhesiveness (or mold releasability) between the recording medium and an outer peripheral surface of the endless belt is different between a first region and a second region. Accordingly, the shearing stress is generated in various places in a plane of a recording medium disposed so as to face a peel starting point present on an outer peripheral surface of an endless belt, and, due to the shearing stress, stable releasability of a recording medium is developed. In such the mold releasing of a recording medium, in order to peel a recording medium and an endless belt, which are in contact with each other, some mechanical means is not used to forcibly apply an external force to the recording medium. Accordingly, even when an endless belt is driven over a long term, a recording medium does not cause troubles in the mold releasing.

Still furthermore, since an endless belt contains a polyimide resin, in comparison with a belt in which a mold releasing layer is disposed on a belt base material, excellent wear resistance and the mechanical strength are possessed.

—Contact Angle—

Here, "contact angles to water are different from each other" means that an absolute value of a difference between a contact angle to water of the first region and a contact angle to water of the second region (hereinafter, in some cases, referred to as "contact angle difference") is 5° or about 5° or more. When the contact angle difference is 5° or less than about 5°, a boundary line of two regions becomes difficult to work as a peel starting point, resulting in deteriorating the peelability.

The contact angle difference is preferably 10° or about 10° or more and more preferably 20° or about 20° or more. Furthermore, the upper limit value of the contact angle difference is not restricted to a particular value. However, the upper limit value is practically preferably 40° or about 40° or more.

On the other hand, an endless belt of the exemplary embodiment, in an image forming apparatus, is used as an endless belt (such as a fixing belt, a transfer delivery belt, and an intermediate transfer belt). When usages as the endless belt are considered, among the fixing belt, transfer delivery belt and intermediate transfer belt, one to which relatively highest peelability is required is the fixing belt that is high in the adhesiveness when it is brought into contact with the recording medium. From similar viewpoint, one to which the next highest peelability is required is a transfer delivery belt and one that is lowest in requirement to the peelability is an intermediate transfer belt.

From the above-mentioned viewpoints, when an endless belt of the exemplary embodiment is used as a fixing belt, the contact angle difference is more preferably 20° or about 20° or more and still more preferably 25° or about 25° or more. When the contact angle difference is 20° or less than about 20°, in some cases, the peelability required as a fixing belt may not be secured.

Furthermore, when the endless belt of the exemplary embodiment is used as a transfer delivery belt, the contact angle difference is more preferably 10° or about 10° or more and still more preferably 20° or about 20° or more. When the contact angle difference is 10° or less than about 10°, in some cases, the peelability required as the transfer delivery belt may not be secured.

When the endless belt of the exemplary embodiment is used as an intermediate transfer belt, as mentioned above, the contact angle difference may be at least 5° or about 5° or more.

Here, the contact angle to water of the first region or the second region is measured according to a method shown below.

In the beginning, a sample piece (vertical 50 mm×horizontal 50 mm) cut out of an endless belt is adhered onto a flat glass substrate to form a measurement sample. The measurement is executed under an environment of 25° C. and 60% RH. Such a measurement sample is disposed on a sample table of a contact angle meter CA-X (trade name, manufactured by Kyowa Interface Science Co.) and 50 μl of water is dropped by use of a micro-syringe onto a measurement portion (within the first region or second region). At 30 sec after a water drop is dropped, a contact angle of water (an angle that a water drop forms with a sample surface) is measured based on a three-point manual measurement with a CCD. A similar procedure is repeated to measure 5 points and an average value thereof is taken as a contact angle of water.

When the measurement is executed, a water drop is dropped at a position that does not straddle a boundary line between a first region and a second region. Furthermore, a measurement value due to a water drop dropped at a position that straddles a boundary line (when, even when a measurement error is considered, a discrepancy from the contact angle of the first region and the contact angle of the second region is excessively large to exhibit an intermediate value of the contact angle of the first region and the contact angle of the second region) is neglected to obtain an average value.

—Area Ratio of First Region and Second Region—

In an endless belt of the exemplary embodiment, in an outer peripheral surface, a sum total of areas of the first region and a sum total of areas of the second region is necessarily in the range of 80:20 or about 80:20 to 20:80 or about 20:80, preferably in the range of 70:30 or about 70:30 to 30:70 or about 30:70 and more preferably in the range of 60:40 or about 60:40 to 40:60 or about 40:60.

When an area ratio of two regions is outside of a range of 80:20 or about 80:20 to 20:80 or about 20:80, the releasability is not differentiated from that of an endless belt of which outer peripheral surface is made of a single region (a single region where a contact angle to water is same over a whole surface).

Furthermore, as mentioned above, in the case of the difference of the peelability required due to the difference of applications of the fixing belt, transfer delivery belt and intermediate transfer belt being taken into consideration, when the endless belt of the exemplary embodiment is applied as a fixing belt, an area ratio of two regions is more preferably in the range of 60:40 or about 60:40 to 40:60 or about 40:60 and still more preferably in the range of 55:45 or about 55:45 to 45:55 or about 45:55. When the area ratio of two regions is outside of 60:40 or about 60:40 to 40:60 or about 40:60, in some cases, the peelability required for the fixing belt may not be secured.

Still furthermore, in the case of the endless belt of the exemplary embodiment being applied as a transfer delivery belt, an area ratio of two regions is more preferably in the range of 70:30 or about 70:30 to 30:70 or about 30:70 and still more preferably in the range of 60:40 or about 60:40 to 40:60 or about 40:60. When the area ratio of two regions is outside of 70:30 or about 70:30 to 30:70 or about 30:70, in some cases, the peelability required for the transfer delivery belt may not be secured.

When the endless belt of the exemplary embodiment is used as an intermediate transfer belt, an area ratio of two regions may be in the range of 80:20 or about 80:20 to 20:80 or about 20:80.

—Layout Patterns of the First and Second Regions—

Layout patterns of the first and second regions, as far as these satisfy the above-mentioned ranges of the area ratio of the two regions, are not restricted particularly. For instance, a first region and a second region may be alternately disposed in an intersected band or in a checkered pattern or, as in a polka-dot pattern, in any one of the regions, the other region may be discretely disposed.

Layouts of the first and second regions may be regular one or irregular one. However, regular one is more preferred.

When the two regions are regularly arranged on an outer peripheral surface, in all portions of the outer peripheral surface, uniform and homogeneous releasability may be imparted. The "regularly" means that two regions are disposed line-symmetrically with respect to an arbitrary straight line on an outer peripheral surface, and/or point-symmetrically with respect to an arbitrary point on an outer peripheral surface. Furthermore, the regular arrangement may be satisfied not only over an entire surface of an outer peripheral surface but also in at least a partial range of the outer peripheral surface.

Furthermore, when a boundary line between the first and second regions that are adjacent to each other includes a straight line portion, the linear boundary line may be disposed in parallel with a circumferential direction of the outer peripheral surface of the endless belt or in parallel with a width direction thereof. However, from the viewpoint of heightening the peelability, the linear boundary line is disposed preferably so as to form an angle of 30° to 60° and more preferably so as to form an angle of 40° to 60° with respect to a width direction of the outer peripheral surface of the endless belt.

From the viewpoint of easily forming patterns of the first and second regions, all boundary lines formed between the first and second regions disposed on an outer peripheral surface of the endless belt may well be formed into a straight line.

Furthermore, when, like in a stripe pattern or a checkered pattern, the boundary line is made of a plurality of parallel straight lines, from the viewpoint of more assuredly securing the peelability, the number of linear boundary lines in the outer peripheral surface is preferably at least 10 or more and more preferably 100 or more. The upper limit value of the number of the linear boundary lines in the outer peripheral surface is not restricted to particular one. However, the number of the linear boundary lines is practically preferably 1000 or less.

Still furthermore, the boundary lines may be disposed in an arbitrary region in a width direction of the outer peripheral surface. However, when, in a state where an endless belt is attached to an image forming apparatus, with a longer direction of the sheet set as a sheet feeding direction, a B5 size sheet is fed, the boundary lines are preferably disposed at least in a region where the B5 size sheet comes into contact. In this case, other than the B5 size sheet, in general BA4 or A3 size sheets as well, the peelability may be obtained.

In the next place, specific examples of layouts and shapes of the first and second regions in an outer peripheral surface will be described with reference to the drawings.

Figure 1B:
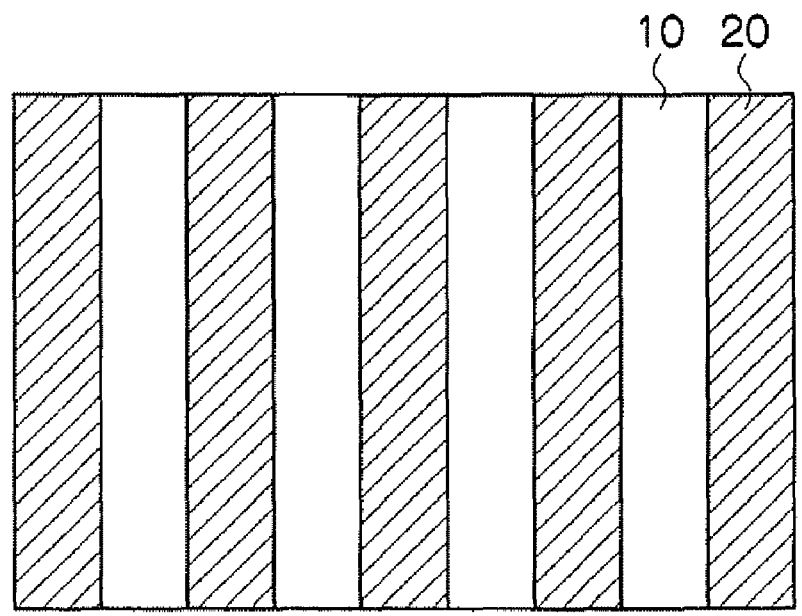

FIGS. 1A and 1B are rough schematic diagrams showing an example of layout and shape of the first and second regions in an outer peripheral surface of an endless belt of the exemplary embodiment, an outer peripheral surface being partially enlarged. Here, FIG. 1A is a diagram showing a state where band-like first and second regions in parallel with a circumferential direction are alternately disposed in a width direction, and FIG. 1B is a diagram showing a state where band-like first and second regions in parallel with a width direction are alternately disposed in a circumferential direction. Furthermore, in the drawing, reference numerals 10 and 20, respectively, express a first region (or a second region) and a second region (or a first region), and a single arrow mark expressed by a reference mark R expresses a circumferential direction of an endless belt (hereinafter, same as well in FIGS. 2 to 4).

In FIGS. 1A and 1B, widths of the respective regions are not particularly restricted. However, in view of securing sufficient peelability even to a small size sheet such as a B5 size one and easiness of forming a pattern, the width is preferably from 0.5 mm to 10.0 mm and more preferably from 1.0 mm to 5.0 mm.

Figure 2A:
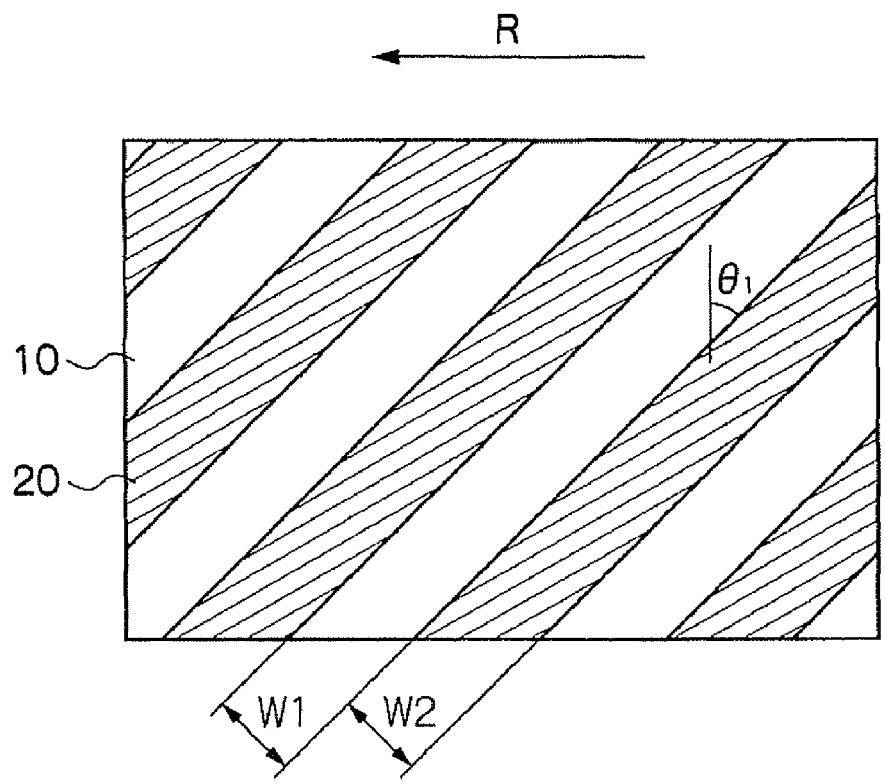
FIGS. 2A and 2B are rough schematic diagrams each showing an example of an arrangement and a shape in a first region and a second region in an outer peripheral surface of an endless belt of the present exemplary embodiment.
Figure 2B:
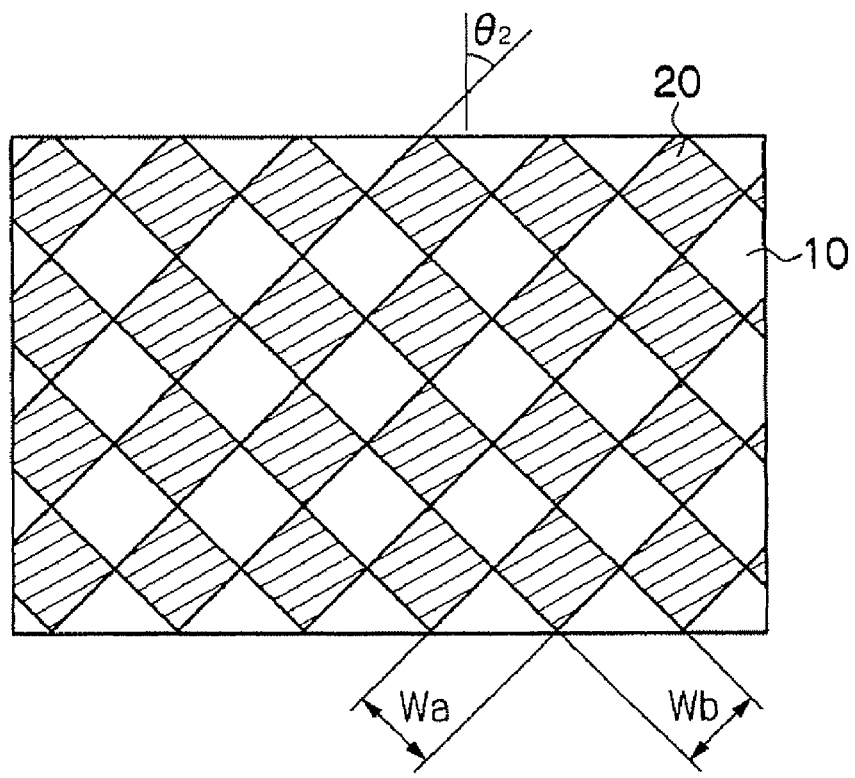

FIGS. 2A and 2B are rough schematic diagrams showing an example of layouts and shapes of the first and second regions in an outer peripheral surface of an endless belt of the exemplary embodiment, an outer peripheral surface being partially enlarged. Here, FIG. 2A is a diagram showing a state where band-like first and second regions are alternately disposed so that linear boundary lines of the two regions form an angle $\theta 1$ ($\theta 1$ is an acute angle in the range of from about 30° to 60°) to a width direction (a direction orthogonal to an arrow mark R direction). FIG. 2B is a diagram showing a state where the first and second regions are formed in a checkered pattern and boundary lines of the two regions are disposed so as to form an acute angle at an angle $\theta 2$ ($\theta 2$ is an acute angle in the range of from about 30° to 60°) to a width direction. Furthermore, in the drawings, reference marks W1, W2, Wa and Wb, respectively, express a width of the first region 10, a width of the second region 20, vertical lengths of the first region 10 and the second region 20 and horizontal lengths of the first region 10 and second region 20.

In FIGS. 2A and 2B, W1 and W2 are not particularly restricted. However, in view of securing sufficient peelability even to a small size sheet such as a B5 size one and easiness of forming a pattern, the width is preferably from 0.5 mm to 10.0 mm and more preferably from 1.0 mm to 5.0 mm. Furthermore, neither Wa nor Wb are particularly restricted. However, from the viewpoints similar to the above, Wa and Wb are preferably from 0.5 mm to 10.0 mm and more preferably from 1.0 mm to 5.0 mm.

Figure 3A:
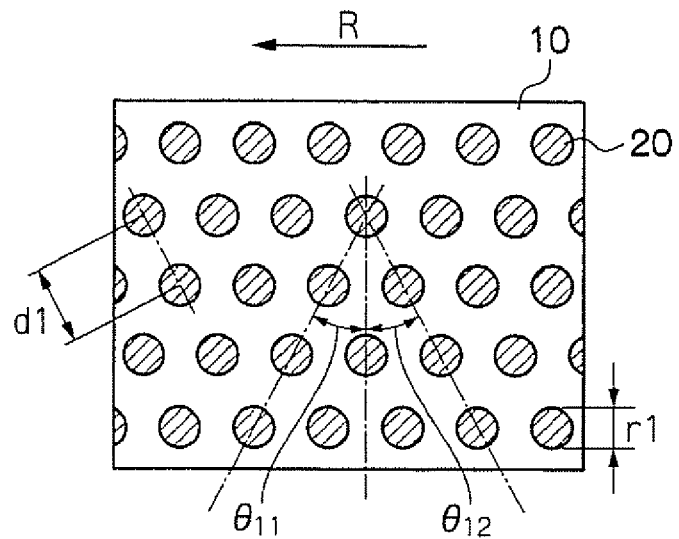
FIGS. 3A through 3C are rough schematic diagrams each showing an example of an arrangement and a shape in a first region and a second region in an outer peripheral surface of an endless belt of the present exemplary embodiment.
Figure 3B:
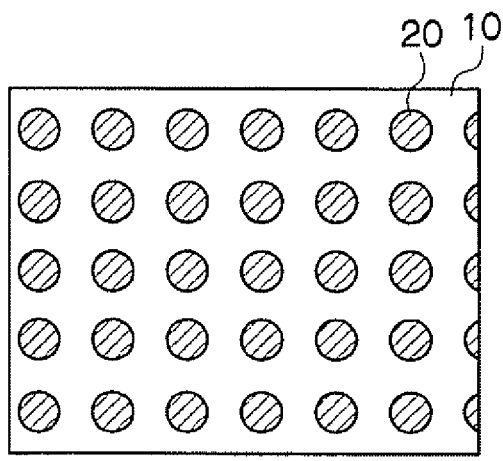
Figure 3C:
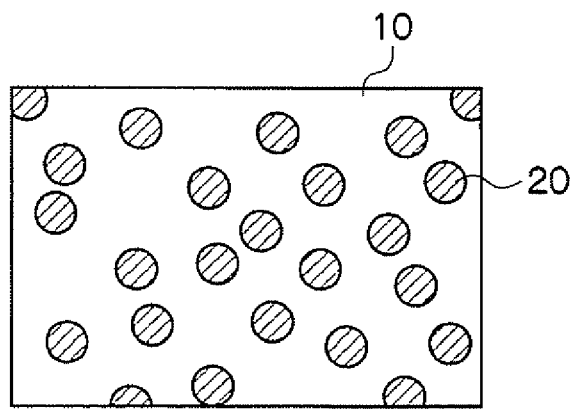

FIGS. 3A to 3C are rough schematic diagrams showing other examples of layouts and shapes of the first and second regions in an outer peripheral surface of an endless belt of the exemplary embodiment, wherein a part of an outer peripheral surface in which circular other regions are disposed discretely in one region is enlarged. Here, FIG. 3A shows an example where circular regions are disposed in a staggered manner, FIG. 3B shows an example where circular regions are disposed in square, and FIG. 3C shows an example where circular regions are randomly disposed. Furthermore, in FIG. 3A, r1 expresses a diameter of a second region 20, θ11 and θ12, respectively, express angles that a width direction (a direction orthogonal to a direction of an arrow mark R) and straight lines formed by connecting center points of a plurality of second regions disposed equidistance apart so as to intersect with a width direction form, and d1 expresses a distance between center points of the second regions that are disposed equidistance apart so as to intersect with a width direction and located adjacent to each other.

As an example is shown in FIGS. 3A to 3C, when circular other regions are discretely disposed in one region, a diameter of the circular region, from the viewpoint of securing sufficient peelability to a small size sheet such as about B5 size and easiness of forming a pattern, is preferably from 1.0 mm to 100.0 mm and more preferably from 5.0 mm to 20.0 mm.

Figure 4A:
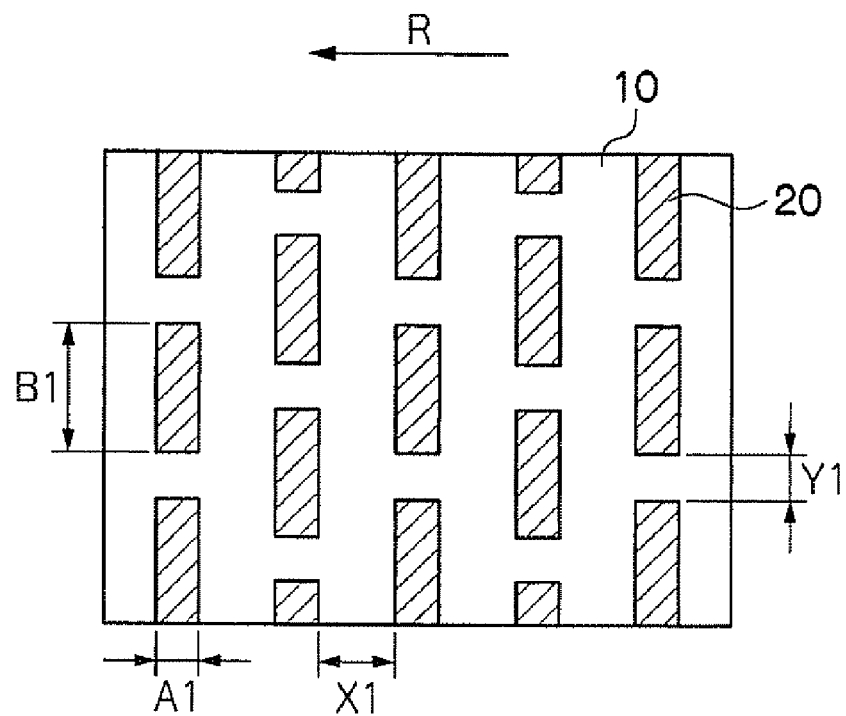
FIGS. 4A and 4B are rough schematic diagrams each showing an example of arrangement and shape in a first region and a second region in an outer peripheral surface of an endless belt of the present exemplary embodiment.
Figure 4B:
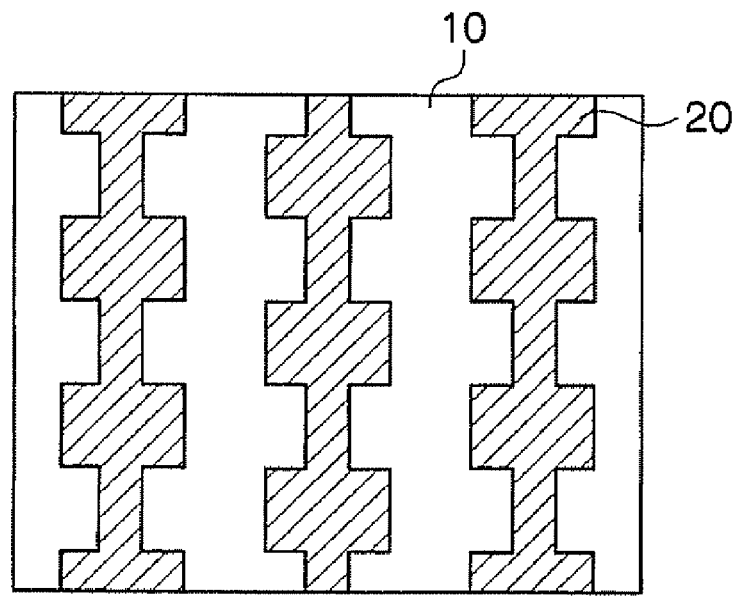

FIGS. 4A and 4B are rough schematic diagrams showing other examples of layouts and shapes of the first and second regions in an outer peripheral surface of an endless belt of the exemplary embodiment. FIG. 4A shows by partially enlarging an outer peripheral surface where band-like other regions are disposed discretely in one region, FIG. 4B shows by partially enlarging an outer peripheral surface where the first and second regions continuously disposed in a direction orthogonal to a rotation direction are alternately disposed in a rotation direction, and reference numerals and marks in the drawing are same as that shown in FIGS. 3A to 3C.

Furthermore, in FIG. 4A, A1 expresses a distance in a direction in parallel with a direction of an arrow mark R of the second region 20, B1 expresses a distance in a direction in parallel with a direction of width (a direction orthogonal to a direction of arrow mark R) of the second region 20, X1 expresses a distance between the second regions 20 disposed adjacent to each other in a direction of an arrow mark R and Y1 expresses a distance between the second regions 20 disposed adjacent to each other in a width direction (a direction orthogonal to a direction of an arrow mark R).

In an example shown in FIG. 4A, band-like second regions 20 are disposed in a staggered manner so that a short direction thereof may be in parallel with a rotation direction. Furthermore, in an example shown in FIG. 4B, second regions 20 that are continuously disposed in a direction orthogonal to a rotation direction (a width direction of an outer peripheral surface) and have a shape where, to a width direction of an outer peripheral surface, a wide portion and a narrow portion in width in a rotation direction are periodically repeated and first regions 10 are alternately disposed in a rotation direction.

A width of the second region 20 shown in FIG. 4A, widths of the first region 10 and second region 20 shown in FIG. 4B, and a distance between two second regions 20 disposed so as to be adjacent each other in a circumferential direction shown in FIG. 4A are not restricted to particular ones. However, these are preferably set in the ranges in accordance with the case where the layouts and shapes pattern shown in FIGS. 1A to 1C are exemplified.

—Ten-Point Average Roughness Rz of Outer Peripheral Surface—

Furthermore, in the endless belt of the exemplary embodiment, a ratio of the ten-point average roughness Rz (Rz(2)) of the second region to the ten-point average roughness Rz (Rz (1)) of the first region (=Rz(2)/Rz(1), hereinafter, in some cases, referred to as "Rz ratio") is preferably from 0.8 or about 0.8 to 1.2 or about 1.2, more preferably from 0.9 or about 0.9 to 1.1 or about 1.1, and most preferably 1.0 or about 1.0.

When the Rz ratio is 0.8 or less than about 0.8, in some cases, the peelability of a recording medium becomes insufficient. Furthermore, in the case when the Rz ratio is 1.2 or exceeds about 1.2, when an endless belt of the exemplary embodiment is used as a fixing belt, fixing defect of toner may be caused, and, when it is used as an intermediate transfer belt, transfer residue of toner may be caused or continuous usage may not be withstood.

Here, the ten-point average roughness Rz (R(z) stipulated by JIS B 0601 (1994)) of each of the regions is measured with a sample piece cut out of an endless belt and adhered on a flat glass substrate as a measurement sample by use of a surface roughness meter Surfcom 570A (trade name, manufactured by Tosei Engineering Corp.). At the measurement, a stylus is scanned so as not to straddle a boundary line of the two regions, each of a first region and a second region is measured of the Rz at ten points, and, from average values thereof, the Rz ratio is obtained.

In what follows, measurement conditions of the Rz are shown.

Shape of stylus tip: conical stylus (θ=90°)
Diameter of stylus tip: r of tip portion (tip)=2 μm
Scan distance: 10.0 mm The ten-point average roughness Rz means a value defined by a formula (1) below, that is, a value (unit: μm) that means, when a reference length (5.0 mm) is sampled in a direction of an average line from a measured roughness curve and a sampled portion is measured in a direction of vertical multiplication from an average line of the sampled portion, a sum total of an arithmetic average value of absolute values of peak heights from the highest peak ($Yp1$) to the fifth highest peak ($Yp5$) and an arithmetic average value of absolute values of peak heights from the lowest peak ($Yv1$) to the fifth lowes peak ($Yv5$).

$Rz=|Yp1+Yp2+Yp3+Yp4+Yp5|/5+|Yv1+Yv2+Yv3+Yv4+Yv5|/5$ •Formula (1):

—Imidization Rates of First and Second Regions—

Furthermore, an imidization rate of the first region and an imidization rate of the second region preferably satisfy a formula below.

|imidization rate of first region−imidization rate of second region|≧20 •Formula (2):

In the formula (2), the imidization rate means a value shown by a formula (3) below.

imidization rate=$\{(Abs(C=O))/(Abs(Ar))\}/k \times 100$ •Formula (3):

[In the formula (3), Abs (C=O) expresses the absorbance of a peak appearing at 1700 $cm^{-1}$ to 1850 $cm^{-1}$ and caused by a carbonyl group derived from an imide group that constitutes the polyimide-based resin, and Abs (Ar) expresses the absorbance of a peak appearing at 1400 $cm^{-1}$ to 1600 $cm^{-1}$ and caused by a benzene ring that constitutes the polyimide-based resin, and k expresses a constant number (a value of Abs (C=O)/Abs (Ar) of a film obtained by burning a polyimide resin film at 400° C.)].

The absorbance in the range of from 1700 $cm^{-1}$ to 1850 $cm^{-1}$ and the absorbance in the range of from 1400 $cm^{-1}$ to 1600 $cm^{-1}$ in the first and second regions are obtained from infrared absorption spectrum of a polyimide-based resin. The infrared absorption spectrum is measured as a reflection spectrum of an outer peripheral surface of an endless belt by use of a microscope FT-IRFT-530 (trade name, manufactured by Horiba Ltd.).

Furthermore, a constant K value is a value that expresses a value of Abs (C=O)/Abs (Ar) of a polyimide film sample that is obtained by coating components used to synthesize a polyimide-based resin on a glass substrate, followed by drying for 30 min at 120° C., further followed by heat treating at 400° C. for 1 hr to complete an imidization reaction. A polyimide-based resin having the value corresponds to one in which the imidization reaction is executed by 100%.

The "components used to synthesize a polyimide-based resin" mean only components indispensable for synthesizing a polyimide-based resin contained in an endless belt of the exemplary embodiment, that is, various kinds of additive components (such as conductive agent such as carbon black or the like) added and dispersed, as needs arise, in a polyimide-based resin matrix in a state formed into an endless belt are eliminated.

When the condition shown in the formula (2) is not satisfied, the contact angle difference becomes smaller to result in, in some cases, being incapable of securing sufficient peelability. From the viewpoint of obtaining larger contact angle difference, a value of |imidization rate of first region–imidization rate of second region| is preferably 20 or more and more preferably 30 or more. The upper limit value of a value of |imidization rate of first region–imidization rate of second region| is not particularly restricted. However, from the viewpoint of practical standpoint such as securing manufacturability in a production method of an endless belt described below, the upper limit value is preferably 50 or less.

In the endless belt of the exemplary embodiment, both of a polyimide-based resin that constitutes a first region and a polyimide-based resin that constitutes a secondary region are produced from same resin materials such as monomers used to synthesize and under same polymerization conditions when monomers are polymerized. However, when, after a cylindrical endless belt is once formed of a polyimide-based resin, a surface treatment described below is applied to differentiate the imidization rate between a first region and a second region, a contact angle difference of the first region and the second region may be readily controlled at 5° or about 50 or more.

—Constituent Materials of Endless Belt—

In an endless belt of the exemplary embodiment, other than the polyimide-based resin, in order secure the various characteristics other than the mold releasing property, which are necessary when the endless belt is used as an endless belt in an image forming apparatus, as needs arise, a conductive agent such as carbon black, metal powder or polyaniline or other component is added. In what follows, constituent materials constituting an endless belt and raw materials necessary for preparing an endless belt will be described.

<As to Various Kinds of Constituent Materials when Polyimide-Based Resin is Used>

—Polyimide-Based Resin—

A polyimide-based resin used in the exemplary embodiment means a polymer in which an imide ring bond is introduced in a molecular main chain with a definite regularity. Specifically, a so-called polyimide resin or polyamideimide resin is meant.

In what follows, various kinds of constituent materials when a polyimide resin is used as the polyimide-based resin will be more detailed and a case where a polyamideimide resin is used will be described below.

Such the polyimide resin is a polyimide resin obtained by subjecting a polyamic acid resin that is a condensate of so-called tetracarboxylic dianhydride and a diamine compound to a dehydration and ring closure reaction and has, in a molecular structure of the resin, a structure where a tetracarboxylic acid residual group derived from tetracarboxylic dianhydride that is a raw material (showing a structure where, from a tetracarboxylic acid structure, four carboxylic group structures in a molecule are subtracted) and a diamine compound residual group derived from a diamine compound that is similarly a raw material (showing a structure where, from a diamine compound structure, two amino group structures in a molecule are subtracted) are contained, and, the tetracarboxylic acid residual group and the diamine residual group are bonded through an imide ring bond.

On the other hand, a polyamideimide resin means a polymer in which in a molecular main chain thereof an imide ring bond and an amide ring bond are introduced with a definite regularity. Specifically, a polyamideimide resin obtained with a trimellitic acid where three carboxyl groups are bonded to one aromatic ring as a main raw material can be cited.

—Polyamic Acid—

The solution of the polyamic acid for use in synthesis of the polyimide resin may be a solution obtained thorough polymerization reaction of the tetracarboxylic dianhydride with the diamine compound, after mixing thereof in the ratio of around 1:1 in organic polar solvent.

—Tetracarboxylic Dianhydride—

The tetracarboxylic dianhydride for use in production of the polyamic acid is not particularly limited and may be any aromatic or aliphatic compound.

Examples of the aromatic tetracarboxylic acids include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyl tetracarboxylic dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, and the like.

Examples of the aliphatic tetracarboxylic dianhydrides include aliphatic or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic acid, 1,2,3,4-cyclopentanetetracarboxylic dianhydride, 2,3,5-tricarboxycyclopentylacetic dianhydride, 3,5,6-tricarboxynorborane-2-acetic dianhydride, 2,3,4,5-tetrahydrofurantetracarboxylic dianhydride, 5-(2,5-dioxotetrahydrofuranyl)-3-methyl-3-cyclohexene-1, 2-dicarboxylic dianhydride, and bicyclo[2,2,2]-oct-7-ene-2, 3,5,6-tetracarboxylic dianhydride; aromatic ring-containing aliphatic tetracarboxylic dianhydrides such as 1,3,3a,4,5,9b-hexahydro-2,5-dioxo-3-furanyl-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione; and the like.

The tetracarboxylic dianhydride for use in the exemplary embodiment of the invention is desirably an aromatic tetracarboxylic dianhydride, more preferably pyromellitic dianhydride, or 3,3',4,4'-benzophenonetetracarboxylic dianhydride, most preferably 3,3',4,4'-biphenylsulfonetetracarboxylic dianhydride.

These tetracarboxylic dianhydrides may be used alone or in combination of two or more.

—Diamine Compounds—

The diamine compound for use in production of the polyamic acid is not particularly limited, if it is a diamine compound having two amino groups in its molecular structure.

Specific examples thereof include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bound to an aromatic ring and a heteroatom other than the nitrogen atoms of the amino groups such as diaminotetraphenylthiophene; aliphatic diamine and alicyclic diamines such as 1,1-meta xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo$[6,2,1,0^{2.7}]$-undecylenedimethyldiamine, and 4,4'-methylenebis(cyclohexylamine), and the like.

The diamine compound for use in the exemplary embodiment of the invention is preferably p-phenylenediamine, 4,4'-diaminodiphenylmethane, 4,4'-diaminodiphenylether, 4,4'-diaminodiphenyl sulfide, or 4,4'-diaminodiphenylsulfone. These diamine compounds may be used also.

—Combination of Tetracarboxylic Dianhydride and Diamine Compound—

As a polyamic acid, in view of being capable of more improving the mechanical strength of an endless belt of the exemplary embodiment, one made of aromatic tetracarboxylic dianhydride and aromatic-based diamine is preferred.

—Concentration of Solid Content of Polyamic Acid Composition—

A concentration of a solid content in a polyamic acid composition in which, to a polyamic acid solution, as needs arise, other components such as a conductive agent and so on are added is not restricted to particular one. However, from the viewpoint of enabling to readily form a coated film from the polyamic acid composition when an endless belt of the exemplary embodiment is produced, as the concentration of the solid content, a range that develops appropriate viscosity is selected.

The optimum viscosity range of a polyamic acid solution is generally from 1 Pa·s to 100 Pa·s. In order to control into the viscosity range, a concentration of the solid content of a polyamic acid solution is, when an organic polar solvent is used as a solvent, preferably from 5% by weight to 30% by weight.

When the concentration of the solid content is less than 5% by weight, the polymerization degree of polyamic acid is low; accordingly, in some cases, the mechanical strength of the resultant endless belt may be lowered. Furthermore, when the concentration of the solid content at the time of polymerization is higher than 30% by weight, in some cases, an insoluble portion of a monomer that is used as a resin raw material at the time of reaction is caused to almost inhibit a reaction from proceeding, resulting in deteriorating the mechanical strength of the finally obtained endless belt.

—Polymerization Temperature of Polyamic Acid—

A polyamic acid is polymerized preferably at a reaction temperature of from 0° C. to 80° C. This is because, when the reaction temperature is 0° C. or less, the viscosity of a solution becomes high to be difficult to agitate a reaction system. Furthermore, this is because, when a reaction temperature becomes higher than 80° C., in some cases, in parallel with a polymerization of polyamic acid, an imidization reaction is partially caused to cause a problem in the control of a reaction.

—Blending Ratio of Conductive Polymer and Polyamic Acid—

When a conductive polymer is used as a conductive agent, a blending ratio of the conductive polymer to a polyamic acid component in a polyamic acid composition is, without particularly restricting, controlled by a resistance value necessary when an endless belt of the exemplary embodiment is used as an endless belt in an image forming apparatus.

For instance, the surface resistivity (ρs value) required as an intermediate transfer belt or a transfer delivery belt is in a range of from 8 to 13 by a common logarithmic value. Accordingly, when an endless belt of the exemplary embodiment is used in the applications, in order that the resistance characteristics may be stably developed, a kind of the conductive polymer, a blending amount of the conductive polymer, a kind of a dopant and a blending amount of a dopant are controlled.

Accordingly, for instance, when an endless belt of the exemplary embodiment is used as an intermediate transfer belt or a transfer delivery belt, to 100 parts by weight of a polyamic acid resin, the conductive polymer is preferably controlled in the range of from 1 parts by weight to 40 parts by weight. When the blending amount of the conductive polymer is outside of the above-mentioned range, the resistance value becomes difficult to control to one required in the applications.

—Particle Diameter of Conductive Polymer Particles in Polyamic Acid Composition—

When a conductive polymer is contained in a polyamic acid composition, the conductive polymer exists in a state dissolved or dispersed in an organic polar solvent. A particle diameter of conductive polymer particle contained in a polyamic acid composition is preferably 10 μm or less, more preferably 5 μm or less and still more preferably 1 μm or less. When the particle diameter of the conductive polymer particle in the polyamic acid composition exceeds 10 μm, in a resulting endless belt, a conductive polymer forms a large domain structure; as the result, in some cases, the electric characteristics and the mechanical characteristics of the resulting endless belt are deteriorated.

—Conductive Agent—

In the endless belt of the exemplary embodiment, in order to secure the electric characteristics required as the endless belt used in an image forming apparatus, as needs arise, a conductive agent is contained. As available conductive agents, known ones may be used. Examples of preferable conductive agents includes carbon black, ionic conductive materials and conductive polymer materials, and, other conductive powder materials (electric resistance=$10^{-10}$ or more and less than $10^6$ Ωcm, same below) and semiconductive powder materials (electric resistance=$10^6$ Ωcm or more and $10^{13}$ Ωcm or less, same below) may be used.

An amount of a conductive agent that is added to an endless belt is selected depending on an application thereof. When an endless belt is used as an intermediate transfer belt or a fixing belt, the surface electric resistance of an outer peripheral surface is selected so as to be a semiconductive region ($10^6$ Ωcm or more and $10^{13}$ Ωcm or less), and, when an endless belt is used as a transfer delivery belt, the surface electric resistance of an outer peripheral surface is selected so as to be a conductive region ($10^{-10}$ Ωcm or more and less than $10^6$ Ωcm). Here, when an endless belt is used as a transfer delivery belt, as a conductive agent, a metal oxide is preferably used because the conductivity may be readily heightened.

In the next place, various kinds of materials that may be used as the conductive agent will be described.

First of all, as carbon black, fundamentally, conductive carbon black is preferably used. However, semiconductive carbon black as well may be used. Examples of carbon black include ketchen black, acetylene black and so on.

On the other hand, as an ionic conductive substance, for instance, LiCl and so on may be used. Examples of conductive polymer materials include polyaniline, polypyrrole, polysulfone and polyacetylene. Furthermore, other conductive powder material is not particularly restricted. Examples thereof include metals such as aluminum and nickel, metal oxides compound such as yttrium oxide and tin oxide and potassium titanate.

The conductive agents may be used singularly or in a combination of at least two or more kinds thereof. Furthermore, when the above-mentioned conductive agent is blended with a polyamic acid composition, a blending amount thereof is preferably from 20 parts by weight to 40 parts by weight based on 100 parts by weight of polyamic acid. When the blending amount is less than 20 parts by weight or exceeds 40 parts by weight, in some cases, the electric characteristics necessary for an endless belt that is used in an image forming apparatus are difficult to secure.

The conductive agents are selected depending on applications. For instance, when a transparent endless belt is wanted to obtain or an endless belt high in the surface glossiness is wanted to obtain, a metal oxide is preferably used. When an endless belt less in the environmental variation is wanted to obtain, a conductive polymer material is preferably used. When an endless belt that is cheap and is readily controlled in the resistance at the production is wanted to obtain, carbon black is preferably used.

Because excellent dispersion stability is obtained in a polyamic acid composition, the dispersibility into a polyamide-based resin is excellent the fluctuation of the electric resistance of the endless belt is made smaller, the electric field dependency is also small and, when an endless belt is used as a transfer delivery belt or an intermediate transfer belt, the stability with time of the electric resistance where an electric field concentration due to a transfer voltage becomes difficult to occur is excellent, as the conductive agent, oxidized carbon black of which pH is 5 or less is particularly preferably used.

—Oxidized Carbon Black—

When carbon black is oxidized, oxidized carbon black may be produced with a carboxyl group, a quinine group, a lactone Croup and a hydroxyl group imparted on a surface thereof.

The oxidation may be executed according to an air oxidation process where, under a high temperature atmosphere, carbon black is brought into contact with air to react, a process where under normal temperature (25° C.) nitrogen oxide or ozone is used to react, and a process where, after air oxidation under a high temperature, ozone oxidation is carried out under a low temperature.

Specifically, oxidized carbon black may be produced according to a contact process. As the contact process, a channel process, a gas black process and so on can be cited. Furthermore, oxidized carbon black may be produced as well according to a furnace black process that uses a gas or oil as a raw material. As needs arise, after the process is applied, a liquid phase oxidation may be carried out with nitric acid or the like. The oxidized carbon black may be produced according to a contact method and usually a closed furnace process is used to produce. The furnace process may usually produce only carbon black high in the pH and low in a volatile component and the resulting carbon black may be liquid phase processed to control the pH. Accordingly, carbon black that is obtained according to the furnace process and controlled so that the pH may be 5 or less in a later process is as well assumed contained in the oxidized carbon black.

A value of the pH of oxidized carbon black is preferably 5.0 or less, more preferably 4.5 or less, and still more preferably 4.0 or less.

Since the oxidized carbon black of the pH value of which is 5.0 or less has oxygen-containing functional groups such as a carboxyl group, a hydroxyl group, a quinine group and a lactone group on a surface thereof, the dispersibility into a polyimide-based resin is excellent; accordingly, excellent dispersion stability is obtained, thereby, the electric resistance of endless belt may be inhibited from fluctuating and the electric field dependency thereof becomes small. In addition thereto, when the endless belt is used as a transfer delivery belt or an intermediate transfer belt, the electric field concentration due to the transfer voltage becomes difficult to occur.

The pH of the oxidized carbon black may be obtained by preparing an aqueous suspension of carbon black followed by measuring with a glass electrode. Furthermore, the pH of the oxidized carbon black may be controlled depending on conditions such as a processing temperature and a processing time in an oxidizing process.

The oxidized carbon black preferably contains a volatile component in the range of 1% by weight or more and 25% by weight or less, more preferably in the range of from 2% by weight to 20% by weight and still more preferably in the range of from 3.5% by weight to 15% by weight.

When the volatile component is contained less than 1% by weight, an advantage of an oxygen-containing functional group adhered on a surface becomes ineffective, thereby, the dispersibility into a polyimide-based resin may be deteriorated. On the other hand, in the case of the volatile component being contained more than 25% by weight, when the oxidized carbon black is dispersed in the polyimide-based resin, the polyimide-based resin is decomposed or, since water absorbed by oxygen-containing, functional groups on a surface thereof is increased, appearance of a resulting endless belt may be problematic.

Accordingly, when the volatile component is controlled in the above-mentioned range, the dispersibility into a polyimide-based resin may be made more excellent. The volatile component may be obtained from a ratio of organic volatile components (a carboxyl group, a hydroxyl group, a quinine group, a lactone group and so on) effused when the carbon black is heated at 950° C. for 7 min.

Specific examples of the oxidized carbon blacks include "PRINTEX 150T" (trade name, pH: 4.5, volatile component: 10.0%), "SPECIAL BLACK 350" (trade name, pH: 3.5, volatile component: 2.2% by weight), "SPECIAL BLACK 100" (trade name, pH: 3.3, volatile component: 2.2% by weight), "SPECIAL BLACK 250" (trade name, pH: 3.1, volatile component: 2.0% by weight), "SPECIAL BLACK 5" (trade name, pH: 3.0, volatile component: 15.0% by weight), "SPECIAL BLACK 4" (trade name, pH: 3.0, volatile component: 14.0% by weight), "SPECIAL BLACK 4A" (trade name, pH: 3.0, volatile component: 14.0% by weight), "SPECIAL BLACK 550" (trade name, pH: 2.8, volatile component: 2.5% by weight), "SPECIAL BLACK 6" (trade name, pH: 2.5, volatile component: 18.0% by weight), "COLOR BLACK FW200" (trade name, pH: 2.5, volatile component: 20.0% by weight), "COLOR BLACK FW2" (trade name, pH: 2.5, volatile component: 16.5% by weight) and "COLOR BLACK FW2V" (trade name, pH: 2.5, volatile component: 16.5% by weight), which are all manufactured by Degussa AG; and "MONARCH 1000" (trade name, pH: 2.5, volatile component: 9.5% by weight), "MONARCH 1300" (trade name, pH: 2.5, volatile component: 9.5% by weight), "MONARCH 1400" (trade name, pH: 2.5, volatile component: 9.0% by weight), "MOGUL-L" (trade name, pH: 2.5, volatile component: 5.0% by weight) and "REGAL 400R" (trade name, pH: 4.0, volatile component: 3.5% by weight), which are all manufactured by Cabot Corp.).

The oxidized carbon black is, in comparison with general carbon blacks, due to an effect of oxygen-containing functional groups present on a surface as mentioned above, more excellent in the dispersibility into a polyimide-based resin. Accordingly, when the oxidized carbon black is used, in comparison with other conductive agents, an addition amount thereof is preferably heightened. Since, thereby, a content of a conductive agent (carbon black) in an endless belt is increased, the electric resistance value may be inhibited from fluctuating in-plane, that is, an advantage when the oxidized carbon black is used may be exerted to a maximum extent.

—Dispersing Agent—

When, at preparation of an endless belt, a polyamic acid composition in which carbon black is dispersed is used, in order to secure the dispersion stability of the carbon black, a dispersing agent is preferably further used in combination.

As the dispersing agent, as to a molecular weight, a low molecular weight type dispersing agent (molecular weight: about 100 to 1000) or a high molecular weight type dispersing agent (weight average of molecular weight: about 1000 to 100000) may be used, and, as to the ionicity, any kind of dispersing agent selected from a cationic one, an anionic one and a nonionic one may be used.

When a low molecular weight type dispersing agent is used, the dispersing agent may be uniformly absorbed on a surface of the carbon black. However, since the dispersing agent is thickly distributed on a surface of a resulting endless belt, in some cases, the dispersing agent may bleed out of a surface of the endless belt. Furthermore, when an ionic dispersing agent such as a cationic or anionic one is used as a dispersing agent, in some cases, the stability with time of the polyamic acid composition is deteriorated and thereby quality of the endless belt is deteriorated. From the reasons, as the dispersing agent, a nonionic polymer is most preferably used.

—Nonionic Polymer—

Examples of nonionic polymers that can be used include poly(N-vinyl-2-pyrolidone), poly(N,N'-diethyl acrylamide), poly(N-vinyl formamide), poly(N-vinyl acetamide), poly(N-vinyl phthalamide), poly(N-vinyl succinic acid amide), poly (N-vinyl urea), poly(N-vinyl piperidone), poly(N-vinyl caprolactam) and poly(N-vinyl oxazoline). The nonionic polymers may be used singularly or in a combination of a plurality of kinds thereof. Since the dispersibility of carbon black is more improved, as the nonionic polymer, poly-vinyl-2-pyrolidone) is preferably used.

A blending amount of the nonionic polymer in the polyamic acid composition is, based on 100 parts by weight of polyamic acid, preferably in the range of from 0.2 parts by weight to 3 parts by weight. When the blending amount is less than 0.2 parts by weight, in some cases, the carbon black flocculates to deteriorate the electric characteristics of a resulting endless belt. Furthermore, when the blending amount exceeds 3 parts by weight, in some cases, the nonionic polymer itself flocculates to deteriorate the mechanical strength of a resulting endless belt or the electric characteristics thereof.

The polyamic acid composition that is used to prepare an endless belt was described above. However, the polyamic acid composition, without restricting only to the above-mentioned aspect, may be used as well in forms by applying various kinds of improvements, modifications and corrections based on knowledge of skilled in the art.

<Various Kinds of Constituent Materials when Polyamideimide Resin is Used>

—Polyamideimide Resin—

In the next place, various kinds of constituent materials used when a polyimide resin is used as a polyimide-based resin will be more specified.

A polyamideimide resin is a polyamideimide resin obtained by subjecting a polyamide-polyamic acid resin that is a condensate of so-called trimellitic acid and a diamine compound to a dehydration and ring closure reaction and has, in a molecular structure of the resin, a structure where an aromatic ring residual group derived from trimellitic acid that is a raw material (showing a structure obtained by subtracting three carboxyl group structures from a trimellitic acid structure) and a diamine compound residual group derived from a diamine compound that is a raw material (showing a structure obtained by subtracting two amino group structures in a molecule from a diamine compound structure) are contained, and the aromatic ring residual group and the diamine residual group are bonded through an imide ring bond.

Such the polyamideimide resin may be produced according to generally known producing means such as (1) a method where equivalent moles of aromatic tricarboxylic acid monohydrate and aromatic diamine are reacted according to a polycondensation and imidization reaction in an organic polar solvent, under the presence of a dehydration catalyst at a high temperature, (2) a method where equivalent moles of anhydrous aromatic tricarboxylic monochloride and aromatic diamine are reacted according to a polycondensation and imidization reaction in an organic polar solvent at a low temperature, or (3) a method where aromatic tricarboxylic acid monohydrate and aromatic diisocyanate are reacted according to a polycondensation and imidization reaction in an organic polar solvent at a high temperature.

In all cases, raw materials are, while forming an amide bond, polymerized to grow to a high molecular weight body. On the other hand, simultaneously with the growth or after the growth, an amide acid portion executes an imidization reaction in a molecule to obtain a target polyamideimide resin dissolved in a solvent. Accordingly, a polyamideimide resin herein fundamentally has an amide-imide structure. However, the polyamideimide resin herein may be a polyamideimide resin containing a unimidized amide acid portion to some extent.

—Trimellitic Acid—

Specific examples of the respective reaction components in the methods shown in the (1) to (3) are as follows. First of all, as aromatic tricarboxylic acid monoanhydride, trimellitic acid monoanhydride or anhydrous trimellitic monochloride is mainly cited.

—Diamine Compound—

As a diamine compound, a diamine compound used to produce polyamic acid may be used. However, an aromatic diamine compound is particularly preferably used. Examples of aromatic diamine compounds include 3,3'-diaminobenzophenone, P-phenylene diamine, 4,4'-diaminodiphenyl, 4,4'-diaminodiphenylamide, 4,4'-diaminodiphenylmethane, 4,4'-diaminodiphenylether, bis[4-{3-(4-aminophenoxy)benzoyl}phenyl]ether, 4,4'-bis(3-aminophenoxy)biphenyl and bis[4-(3-aminophenoxy)phenyl]sulfone 2,2'-bis[4-(3-aminophenoxy)phenyl]propane. Here, when an aromatic diamine component has an amino bond in a main chain (such as the 4,4'-diaminobenzanilide), as an acid component, aromatic tetracarboxylic acid dianhydride may be combined.

—Diisocyanate Compound—

As a diisocyanate compound, one obtained by substituting two amino groups in a diamine compound used to produce polyamic acid with an isocyanate group may be exemplified. Among the isocyanate compounds, an aromatic diisocyanate compound is particularly preferably used. As the aromatic diisocyanate, one obtained by substituting two amino groups of an aromatic diamine exemplified as one that may be used to produce polyamic acid with an isocynate group may be exemplified.

Specific examples of the diisocyanate compounds may include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate and 2,2'-dimethoxybiphenyl-4,4'-diisocyanate.

Furthermore, as the diisocyanate compound, one obtained by stabilizing an isocyanato group with a blocking agent may be used. As a blocking agent, alcohol, phenol or oxime may be used without particular restriction.

—Solid Content Concentration of Polyamideimide Composition—

A solid content concentration of a polyamideimide composition in which, in a polyamideimide resin solution obtained by dissolving a polyamideimide resin in an organic solvent, as needs arise, other components such as a conductive agent are added is not particularly restricted. However, from the viewpoint of enabling to readily form a coated film due to a polyamideimide composition when an endless belt of the exemplary embodiment is produced, a range where appropriate viscosity is developed is selected.

In general, the viscosity is preferably from 1 Pa·s to 100 Pa·s. In order to control the viscosity in the range, a solid content concentration of a polyamideimide composition is, when an organic polar solvent is used as a solvent, based on 100 parts by weight of the solvent, preferably from 10% by weight to 40 parts by weight. When the solid content concentration is less than 10% by weight, the polymerization degree of polyamideimide is low, and, thereby, in some cases, the mechanical strength of a resulting polyimide-based endless belt is deteriorated.

Furthermore, when the solid content concentration at the polymerization is higher than 40% by weight, an insoluble portion of monomer that is used as a resin raw material at the time of reaction is caused to hardly forward a reaction, resulting in, in some cases, lowering the mechanical strength of a resulting polyimide endless belt.

—Blending Ratio of Conductive Polymer/Polyamideimide—

When a conductive polymer is used as a conductive agent, a blending ratio of a conductive polymer to a polyamideimide component in a polyamideimide composition is, though not particularly restricted, controlled by a resistance value required when an endless belt of the exemplary embodiment is used as an endless belt in an image forming apparatus.

Furthermore, a specific method of controlling the blending ratio is similar to that of a case described in the section of "Blending Ratio of Conductive Polymer/Polyamic Acid" with a polyamic acid resin replaced as it is with a polyamideimide resin.

—Polymerization Temperature of Polyamideimide—

A reaction temperature at the polymerization of polyamideimide is preferably carried on at from 0° C. to 300° C. When the polymerization temperature is 0° C. or less, the viscosity of the solution becomes higher and, in some cases, a reaction system becomes difficult to agitate. Furthermore, when the reaction temperature is higher than 300° C., in parallel with the polymerization of polyamideimide, a decomposition reaction is partially forwarded to lower a molecular weight, thereby, in some cases, the mechanical strength of an endless belt is deteriorated.

—Conductive Agent—

As the conductive agent, one that is same as that when an endless belt is prepared with a polyimide resin may be made use of.

(Producing Method of Endless Belt)

In the next place, a producing method of an endless belt of the exemplary embodiment will be described.

An endless belt of the exemplary embodiment is manufactured by undergoing at least: a coated film forming step where a polyimide-based composition (a polyamic acid composition or a polyamideimide composition) is coated on a surface of a tubular support to form a coated film; a base material forming step where the coated film is, after drying, burned to form a tubular base material; and a surface treatment step where at least one surface treatment selected from a group of a hydrolysis treatment, a plasma treatment, a corona discharge treatment and an UV-irradiation treatment is applied to a specified region of the outer peripheral surface that occupies an area ratio of from 20% or about 20% to 80% or about 80% of an entire area of the outer peripheral surface of the base material.

In the base material forming step, a coated film is heated, thereby, a solvent is distilled and simultaneously an imidization reaction is carried out. In the surface treatment step, a specified region of an outer peripheral surface is surface treated to form a first region and a second region. Here, the "specified region" means a region that becomes a first region (or a second region) after the surface treatment and a region other than the specified region becomes a second region (or a first region) after the surface treatment. Other than the three steps, as needs arise, various steps may be executed. For instance, after the surface treatment step, a washing step of washing the outer peripheral surface may be applied. In the next place, the respective steps will be more detailed.

—Coated Film Forming Step—

In the coated film forming step, a polyimide-based composition (a polyamic acid composition containing a polyamic acid solution obtained by dissolving polyamic acid that is a precursor of a polyimide resin in an organic solvent, or, a polyamideimide composition containing a polyamideimide solution obtained by dissolving a polyamideimide resin in an organic solvent) is coated on a surface of a cylindrical support.

As the cylindrical support, cylindrical one may be preferably used. Furthermore, as a material of a cylindrical support, one made of metal (so-called metal mold) may be preferably used. However, other than metal, various so far known materials such as resin, glass and ceramics may be used.

Furthermore, on a surface of the cylindrical support, as needs arise, glass coat or ceramic coat may be disposed or a silicone-based or fluorine-based mold releaser may be used.

Still furthermore, when a film thickness-controlling metal mold that is controlled in a clearance to a cylindrical support is inserted in a cylindrical support and moved in parallel therewith, a superfluous solution is removed, and, thereby, a thickness of a solution on a cylindrical support may be preferably made uniform. However, when a thickness of a coated solution is controlled uniform at a stage of coating a solution on the cylindrical support, a metal mold for controlling a film thickness may not be used.

A surface of a cylindrical support on which a coated film is formed may be any one of an inner circumference surface and an outer peripheral surface of the cylindrical support. However, when a coated film is formed on an inner circumference surface of the cylindrical support, an outer peripheral surface of a resulting endless belt comes into contact with an inner circumference surface of the cylindrical support; accordingly, in some cases, the endless belt may be contaminated by the tubular support or the characteristics of the endless belt may be deteriorated.

On the other hand, when a coated film is formed on an outer peripheral surface of the tubular support, an outer peripheral surface of a resulting endless belt is inhibited from being contaminated by the tubular support. However, the coated film is dried or burned in a state exposed to an external atmosphere. Accordingly, for instance, when a conductive polymer is used as a conductive agent, the conductive polymer may be deteriorated owing to oxidation, and, when a dopant is used as a conductive agent, in some cases, the dopant may be volatilized.

As mentioned above, depending on whether a coated film is formed on an inner peripheral surface or an outer peripheral surface of a tubular support, there are peculiar problems. Accordingly, by considering on which surface of an inner peripheral surface and an outer peripheral surface of a tubular support a coated film is formed, raw materials used and producing steps have to be optimized.

—Base Material Forming Step—

In the base material forming step, a tubular support on a surface of which a coated film is formed is left in a heating environment or a reduced pressure environment to dry the coated film.

In the drying step, the coated film is dried to volatilize from 20% by weight to 60% by weight or more of a solvent contained in the coated film. At this time, irrespective of whether a solvent remains in the coated film or not, there is no problem as far as a coated film surface is dried and does not flow when it is tilted. When the heating is used to dry, a drying temperature is preferably from 50° C. to 200° C.

After the coated film is dried, the tubular support is burned at a predetermined temperature to forward a imidization reaction. An imidization temperature, although respectively different depending on kinds of tetracarboxylic acid dianhydride and diamine that are raw materials or kinds or addition amounts of tertially amine and dehydration catalyst that are added, has to be set at a temperature where the imidization comes to completion. When an imidization for ring closure is insufficient, in some cases, the rigidity of the polyimide-based resin is deteriorated to result in being insufficient in the mechanical characteristics and electrical characteristics of an endless belt. A burning temperature is preferably from 150° C. to 450° C.

When a base material is formed on an outer peripheral surface of a tubular support, as the base material is set to a tubular support or after a base material is demolded from a tubular support, the base material may be reset on an outer circumference surface of another tubular support.

On the other hand, when a base material is formed on an inner peripheral surface of a tubular support, in order to apply surface treatment on an outer peripheral surface of a base material, after a base material is demolded from an inner peripheral surface of the tubular support, the base material has to be reset on an outer peripheral surface of other tubular support.

—Surface Treatment Step—

In the surface treatment step, to a specified region on an outer peripheral surface of a base material, surface treatment is applied. As a method of applying surface treatment, as far as it may provide a contact angle difference, known methods may be used. A chemical treatment such as hydrolysis treatment or a physical treatment such as a plasma treatment, a corona discharge treatment or a UV-radiation treatment may be used.

In order to execute the surface treatment step, after the base material forming step is executed, a region other than a specified region of an outer peripheral surface of the base material (non-surface treatment region) is preferably subjected to a masking step in advance. In the masking step, for instance, in the non-surface treatment region, an adhesive sheet as a masking member is adhered or a resist film is formed by making use of a photolithography method.

The masking treatment may be made use of when a surface treatment is applied by making use of a chemical treatment and a physical treatment. On the other hand, when a plasma treatment or a corona discharge treatment is applied, furthermore, with a planar member on which a hole corresponding to a specified region is formed disposed between an outer peripheral surface of a base material and an apparatus that executes a physical treatment, a surface treatment may be applied. When a UV-irradiation treatment is applied, with a glass plate on a surface of which a thin film such as Cr that shields UV-ray is formed corresponding to a non-surface treatment region and that transmits light having a wavelength in a UV region disposed between an outer peripheral surface of a base material and an apparatus that executes a physical treatment, a surface treatment may be applied.

—Hydrolysis Treatment—

In the next place, a case where a surface treatment is applied by making use of a hydrolysis treatment will be detailed.

In the hydrolysis treatment, an alkaline solution treatment where an alkaline solution is brought into contact with a specified region of an outer peripheral surface of a base material is used.

As an alkaline solution that is used in the hydrolysis treatment, an aqueous solution in which a basic compound such as a hydroxide or a carbonate of an alkali metal such as lithium, sodium or potassium or an alkaline earth metal such as magnesium or calcium is dissolved in water is used. As such a basic compound, sodium hydroxide or potassium hydroxide is preferred. A concentration of a basic compound in such an alkaline solution is preferably from 0.1% by weight to 20% by weight. When the concentration is less than 0.1% by weight, a reaction does not proceed, and, when the concentration exceeds 20% by weight, the hydrolysis does not uniformly proceed on a surface that is hydrolyzed, thereby, in some cases, the uniformity in a region that is surface treated is damaged. In the alkaline solution, other than water, a solvent miscible with water such as alcohols may be used together.

A hydrolysis treatment is preferably carried out at a temperature in the range of from 20° C. to 100° C. When the temperature is less than 20° C., in some cases, a hydrolysis reaction proceeds slowly to be difficult to efficiently execute a surface treatment. Furthermore, when the hydrolysis temperature exceeds 100° C., while a reaction velocity becomes faster, a reaction may be controlled with difficulty; accordingly, in some cases, the uniformity in a surface treated region is damaged. As a time for the hydrolysis treatment, a level where a target physical property is obtained is selected from 10 sec to 24 hr.

—Acidic Solution Contact Step—

To a specified region where a hydrolysis treatment is applied by making use of an alkaline solution treatment, an acidic solution contact step where an acidic solution is brought into contact is preferably executed.

Here, when a resin component is a polyimide resin, after the hydrolysis treatment, a polyimide resin on a treated surface is hydrolyzed to be a metal salt of polyamic acid. After a treated surface is washed with pure water to remove an adhered alkaline solution, a treatment is carried out in an acidic aqueous solution to convert a metal salt of polyamic acid into polyamic acid. In such an acidic aqueous solution, mineral acid such as hydrochloric acid, nitric acid, sulfuric acid is used.

On the other hand, when a resin component is a polyamideimide resin, after the hydrolysis treatment, a polyamideimide resin on a treated surface is hydrolyzed to be a metal salt of polyamide containing a polyamic acid structure. After a treated surface is washed with pure water to remove an adhered alkaline solution, a treatment is carried out in an acidic aqueous solution to convert a metal salt of polyamic acid structure into a polyamic acid structure. In such an acidic aqueous solution, mineral acid such as hydrochloric acid, nitric acid, sulfuric acid is used.

A concentration of such an acidic solution is preferably from 0.1% by weight to 20% by weight. When the concentration is less than 0.1% by weight, a reaction does not proceed, and, when the concentration exceeds 20% by weight, the hydrolysis does not uniformly proceed on a surface that is hydrolyzed, thereby, in some cases, the uniformity in a region that is surface treated is damaged. In the acidic solution, other than water, a solvent miscible with water such as alcohols may be used together.

A treatment with an acidic solution is preferably carried out at a temperature in the range of from 20° C. to 100° C. When the temperature is less than 20° C., in some cases, a conversion reaction where a metal salt of polyamic acid is converted into polyamic acid proceeds slowly to be difficult to efficiently execute a treatment with an acidic solution. Furthermore, when the temperature exceeds 100° C., while a conversion reaction velocity becomes faster, a reaction may be controlled with difficulty; accordingly, in some cases, the uniformity in a region treated with an acidic solution is damaged. As a time for the treatment with an acidic solution, a level where a target physical property is obtained is selected from 10 sec to 24 hr.

—Post-Process Such as Washing—

A base material on an outer peripheral surface of which, after a series of steps described above, a first region and a second region are formed is preferably washed. After the base material detached from the tubular support, as needs arise, slit working of an end portion, punching and hole making, tape winding may be further applied. After the various post-processes are applied as needs arise, an endless belt of the exemplary embodiment may be obtained.

Although a producing method of an endless belt of the exemplary embodiment was described above, the exemplary embodiment is not restricted to the implementation aspect. Within a range that does not deviate from the gist, based on knowledge of persons skilled in the art, various improvements, modifications and corrections may be added to execute.

(Image Forming Apparatus)

An image forming apparatus of the exemplary embodiment mounts one or more endless belts and, among the at least one endless belt, at least one is an endless belt of the exemplary embodiment.

An endless belt, as far as an outer peripheral surface of an endless belt repeats contact with and peeling off a recording medium when an image is formed, is not particularly restricted. Examples thereof include an intermediate transfer belt, a transfer delivery belt and fixing belt. As the endless belts, an endless belt of the exemplary embodiment may be used.

Accordingly, in a portion where an endless belt of the exemplary embodiment is used as an endless belt of an image forming apparatus, even under a low temperature and low humidity environment, paper clogging may be inhibited from occurring.

As a constitution of an image forming apparatus of the exemplary embodiment, as far as it mounts at least one endless belt, a known constitution may be adopted.

A typical constitution of an image forming apparatus of the exemplary embodiment, one that includes, for instance, an image holding member, charging means for charging a surface of the image holding member, exposing means for exposing a surface of the image holding member to form an electrostatic latent image, developing means for developing an electrostatic latent image formed on a surface of the image holding member with a developing agent to form a toner image, transferring means for transferring a toner image formed on a surface of the image holding member on a recording medium, fixing means for fixing a toner image transferred on a recording medium surface and cleaning means for removing an accretion such as toner and dirt adhered on a surface of the image holding member after a toner image is transferred on a recording medium is cited, and, as needs arise, other known means may be further included.

In an image forming apparatus having an above-mentioned constitution, when an intermediate transfer belt is used, a toner image is transferred according to an intermediate transfer process. In this case, after a toner image formed on a surface of the image holding member is transferred on an outer peripheral surface of an intermediate transfer body at a primary transfer portion, a recording medium is transported to a secondary transfer portion with the recording medium held on an outer peripheral surface of an intermediate transfer body, and, at the secondary transfer portion, the toner image is transferred from an outer peripheral surface of an intermediate transfer body to a recording medium.

Furthermore, in an image forming apparatus having the above-mentioned constitution, when a transfer delivery belt is used, after a toner image formed on a surface of the image holding member is transferred on an outer peripheral surface of a transfer delivery belt, a recording medium is transported to fixing means by means of a transfer delivery belt.

Still furthermore, in an image forming apparatus having the above-mentioned constitution, as fixing means, one that uses a fixing belt may be used as well. The fixing means are provided with at least a pair of fixing members disposed faced so as to press each other and at least one of fixing members may be a fixing belt.

As a specific constitution of the fixing unit (fixing device) provided with a fixing belt, for instance, one that includes at least one driving member, an endless belt (fixing belt) that may be driven and rotated by means of the at least one driving member and a pressing member is cited. In the fixing means, a surface of any one of the at least one driving member, an outer peripheral surface of the endless belt and the pressing member that is disposed in contact with an inner peripheral surface of the endless belt and presses an outer peripheral surface of the endless belt towards a surface of the driving member form a pressure contact portion.

The fixing means may have other constitutions and functions, if necessary, in addition to the above-described constitutions and functions, and for example, a lubricant may be applied on the inner circumference surface of an endless belt. As the lubricant, known lubricants in the form of liquid (for example, silicone oil and the like) may be used. The lubricant may be applied continuously via a felt and the like provided in contact with the inner circumference surface of an endless belt.

It is preferable that the fixing units may control pressure distribution along the axis direction of an endless belt at a press contact part, by the pressing member. For example, when a lubricant is used, the existing condition of the lubricant applied on the inner circumference surface may be arbitrarily controlled such as pushing the lubricant toward one edge of an endless belt and collecting the lubricant at the center part, by regulating the pressure distribution. As a result, it is possible, for example, that excess lubricant is collected to one edge of an endless belt and recovered, and that the lubricant is allowed to move to the center part of an endless belt, thereby preventing pollution in the apparatus due to leakage of the lubricant from the edge of an endless belt.

This control of pressure distribution is particularly useful when a lubricant is used, and further, when irregular roughness in the form of streak is imparted to the inner circumference surface of an endless belt to be used. In this case, control of the existing condition of the lubricant applied on the inner circumference surface becomes easier by regulating the pressure distribution at a press contact part in view of also the direction of a streak of the irregular roughness in the form of streak.

In the next place, a specific example of an image forming apparatus of the exemplary embodiment will be detailed with reference to the drawings. In the specific example shown below, as fixing means, one that is provided with a pair of fixing rolls is used. However, at least one of the fixing rolls may be replaced by a fixing belt.

Figure 5:
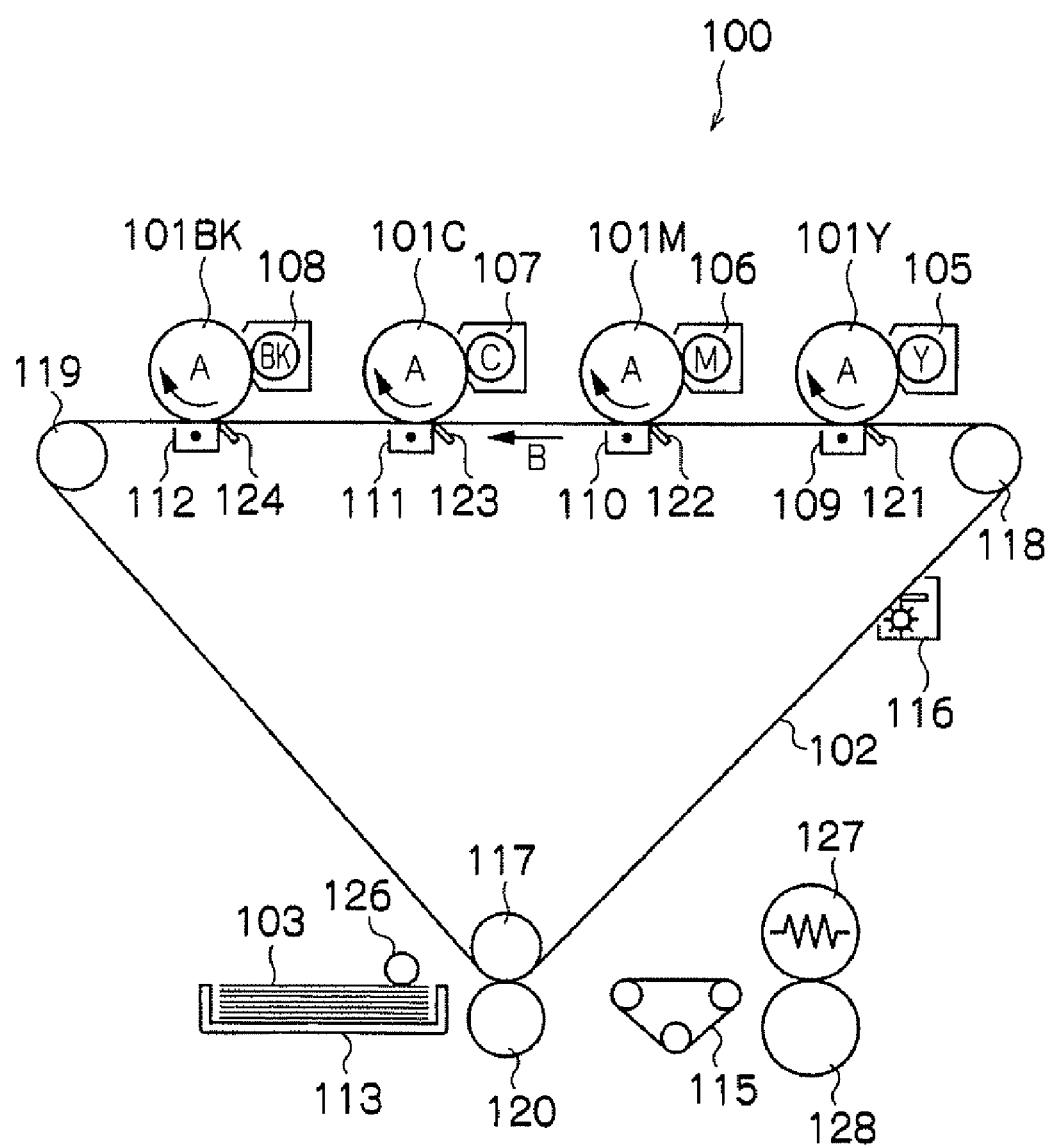
FIG. 5 is a rough schematic diagram showing an example of an image forming apparatus of the exemplary embodiment.

FIG. 5 is a schematic constitutional view showing one of an image forming apparatus according to an exemplary embodiment of the invention. The image forming apparatus according to the exemplary embodiment is an embodiment in which an endless belt according the exemplary embodiment of the invention is applied as the intermediate transfer belt.

An image forming apparatus 100 shown in FIG. 5 is provided with photoreceptor drums 101Y, 101M, 101C and 101BK, and, with a rotation in a direction of an arrow line A, according to a well-known electrophotographic process (not shown in the drawing), on a surface thereof, an electrostatic latent image in accordance with image information is formed (in FIG. 5, charging means and cleaning means are not shown).

Then, around the photoreceptor drums 101Y, 101M, 101C and 101BK, respectively, developers 105 to 108 corresponding to the respective colors of yellow (Y), magenta (M), cyan (C) and black (BK) are disposed, and the respective developers 105 to 108 develop electrostatic latent images formed on the photoreceptor drums 101Y, 101M, 101C and 101BK to form toner images.

Accordingly, for instance, an electrostatic latent image written in the photoreceptor drum 101Y corresponds to yellow image information, the electrostatic latent image is developed by a developer 105 that incorporates a yellow (Y) toner to form a yellow toner image on the photoreceptor drum 101Y.

An intermediate transfer belt 102 is a belt-like intermediate transfer belt disposed so as to come into contact with surfaces of the photoreceptor drums 101Y, 101M, 101C and 101BK, and rotates stretched by a plurality of rolls 117 to 119 in a direction of an arrow line B.

As the intermediate transfer belt 102, an endless belt of the exemplary embodiment mentioned above is applied.

Unfixed toner images formed on the photoreceptor drums 101Y, 101M, 101C and 101BK, at the respective primary transfer positions where the photoreceptor drums 101Y, 101M, 101C and 101BK and the intermediate transfer belt 102 come into contact, are sequentially transferred from the photoreceptor drums 101Y, 101M, 101C and 101BK on a surface of the intermediate transfer belt 102 with the toner images of the respective colors superposed.

At the primary transfer position, on a rear surface side of the intermediate transfer belt 102, corona discharge units 109 to 112 that are, by use of shielding members 121 through 124 for inhibiting a transfer electric field from acting on an unnecessary region of the intermediate transfer belt 102, inhibited from charging contact regions before transfer are disposed. When a voltage having polarity opposite to charging polarity of the toner is applied to the corona discharge units 109 to 112, un-fixed toner images on the photoreceptor drums 101Y, 101M, 101C and 101BK are electrostatically transferred on an outer peripheral surface of the intermediate transfer belt 102. The primary transfer means, as far as it is one that makes use of an electrostatic force, without restricting to a corona discharge unit, may be a conductive roll or a conductive brush to which a voltage is applied.

Unfixed toner images thus primarily transferred on the intermediate transfer belt 102, as the intermediate transfer belt 102 rotates, are transported to a secondary transfer position facing to a transportation path of the recording medium 103. At the secondary transfer position, a secondary transfer roll 120 and rear surface roll 117 in contact with a rear surface side of the intermediate transfer belt 102 are disposed with the intermediate transfer belt 102 sandwiched therebetween.

A recording medium 103 delivered from a sheet feeder 113 at a predetermined timing by means of a delivery roller 126 is passed through between the secondary transfer roll 120 and the intermediate transfer belt 102. At this time, a voltage is applied between the secondary transfer roll 120 and the roll 117 and un-fixed toner images held on the intermediate transfer belt 102 are transferred at the secondary transfer position on the recording medium 103.

The recording medium 103 carrying thereon the transferred un-fixed toner image is peeled from the intermediate transfer belt 102, and fed by a delivery belt 115 into between a heating roll 127 and a pressing roll 128 of a fixing unit having the heating roll 127 and pressing roll 128 provided in facing positions, and a fixation treatment of the un-fixed toner image is performed. In this case, an apparatus constitution having simultaneous transfer and fixation processes by which a secondary transfer process and a fixation process are conducted simultaneously is also possible.

The intermediate transfer belt 102 is provided with a cleaning unit 116. The cleaning unit 116 is disposed freely detachably from the intermediate transfer belt 102 and separated from the intermediate transfer belt 102 until the secondary transfer is executed.

Figure 6:
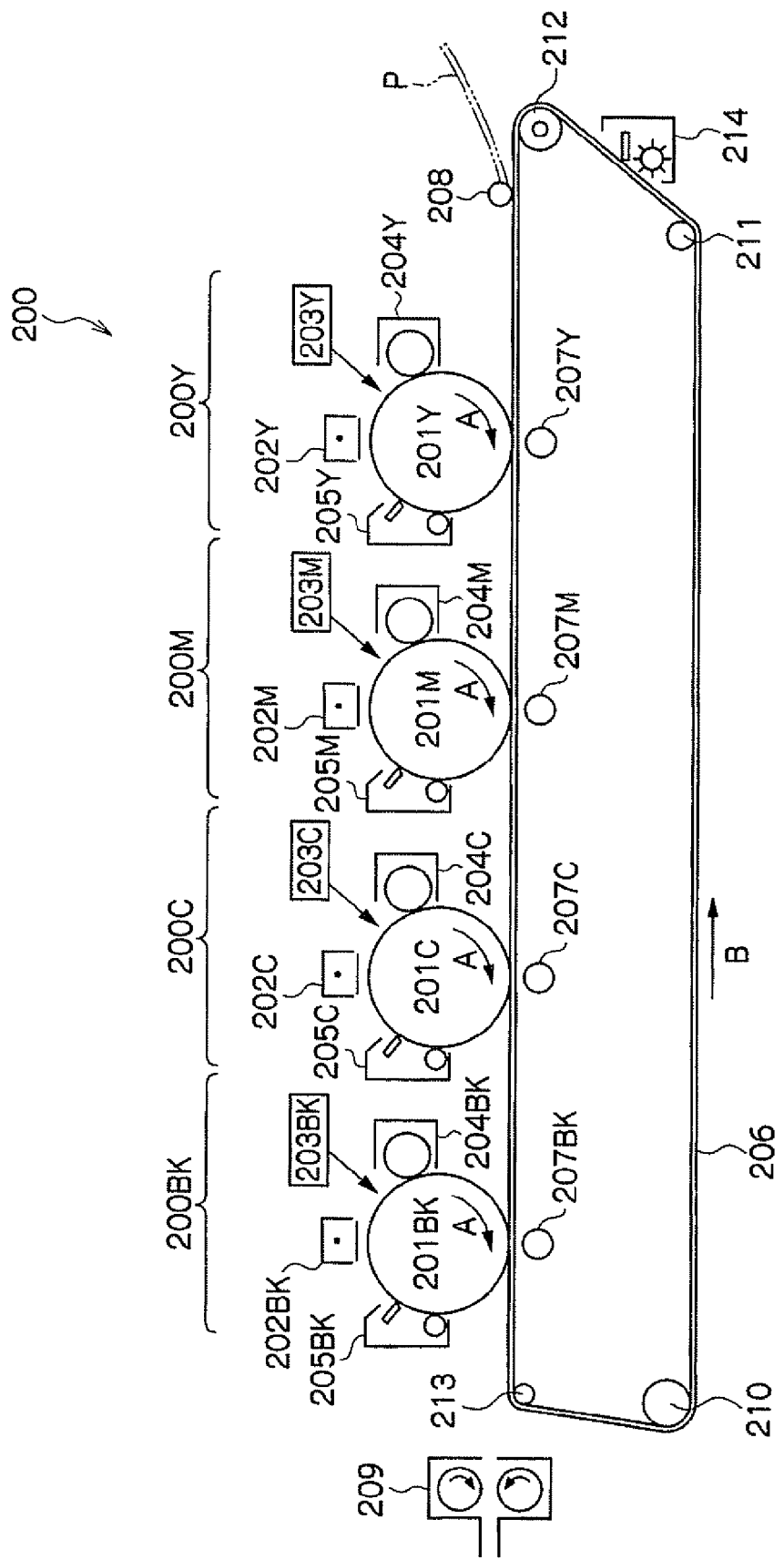
FIG. 6 is a rough schematic diagram showing another example of an image forming apparatus of the exemplary embodiment.

FIG. 6 is a schematic configurational diagram showing another example of an image forming apparatus of the exemplary embodiment. In the image forming apparatus, as a transfer delivery belt, an endless belt of the exemplary embodiment is applied.

An image forming apparatus 200 shown in FIG. 6 includes image forming units 200Y, 200M, 200C and 200Bk provided with a photoreceptor drum, charging means, a developer and a photoreceptor drum cleaner, a transfer delivery belt 206, transfer rolls 207Y, 207M, 207C and 207Bk, a recording medium delivery roll 208 and fixing means 209. As the transfer delivery belt 206, an endless belt of the exemplary embodiment is provided.

In the image forming units 200Y, 200M, 200C and 200Bk, photoreceptor drums 201Y, 201M, 201C and 201Bk as image holding members are provided in rotatable fashion with predetermined peripheral velocity along the arrow A direction (clockwise direction). Around the photoreceptor drums 201Y, 201M, 201C and 201Bk, placed are charging units 202Y, 202M, 202C and 202Bk, exposing units 203Y, 203M, 203C and 203Bk, developing units of respective colors (yellow developing unit 204Y, magenta developing unit 204M, cyan developing unit 204C, black develop.

The image forming units 200Y, 200M, 200C and 200Bk are placed in parallel against the transfer delivery belt 206 in the order of the image forming units 200Y, 200M, 200C and 200Bk, however, proper orders may be set depending on the image formation method such as an order of the image forming units 200Bk, 200Y, 200C and 200M.

The transfer delivery belt 206 is rotatable at the same peripheral velocity as the photoreceptor drums 201Y, 201M, 201C and 201Bk along arrowed B direction (counterclockwise direction) by supporting rolls 210, 211, 212 and 213, and parts of the transfer delivery belt 206 situated at intermediate positions between the supporting rolls 212 and 213 are placed so as to come into contact with the photoreceptor drums 201Y, 201M, 201C and 201Bk, respectively. The transfer delivery belt 206 is provided with a belt cleaning apparatus 214.

Transferring rolls 207Y, 207M, 207C and 207Bk are placed at positions which are inside of the transfer delivery belt 206 and face portions of contact between the transfer delivery belt 206 and the photoreceptor drums 201Y, 201M, 201C and 201Bk, respectively. Transfer regions for transferring toner images to recording media P via the transfer delivery belt 206 are formed between the photoreceptor drums 201Y, 201M, 201C and 201Bk, and the transferring rolls 207Y, 207M, 207C and 207Bk.

A fixing unit 209 is so placed that the recording media P is delivered to the fixing unit after passing through respective transferring regions between the recording media delivery belt 206 and the photoreceptor drums 201Y, 201M, 201C and 201Bk.

The recording media P is delivered to the transfer delivery belt 206 by a recording media delivery roll 208.

In the image forming unit 200Y, the photoreceptor drum 201Y is driven to rotate. A charging unit 202Y is driven in conjunction with the photoreceptor drum 201Y, thereby charging the surface of the photoreceptor drum 201Y with predetermined polarity and potential. The photoreceptor drum 201Y having the charged surface is, then, exposed in image-like fashion by the exposing unit 203Y, to form an electrostatic latent image on its surface.

Subsequently, the electrostatic latent image is developed by the yellow developing unit 204Y. Then, a toner image is formed on the surface of the photoreceptor drum 201Y. The toner may be a one-component system or a two-component system, and in this exemplary embodiment, it is a two-component system.

The toner images go past a transfer region between the photoreceptor drum 201Y and the transfer delivery belt 206. Simultaneously therewith, a recording medium P is electrostatically absorbed by the transfer delivery belt 206 and delivered to a transfer region. There, the toner images are, due to an electric field formed by a transfer bias applied from a transfer roll 207Y, sequentially transferred on an outer peripheral surface of the recording medium P.

Thereafter, a toner remaining on the photoreceptor drum 201Y is cleaned and removed by means of a photoreceptor drum cleaner 205Y. Thereby, the photoreceptor drum 201Y is supplied to a next transfer cycle.

The transfer cycle mentioned above is similarly executed at image forming units 200M, 200C and 200Bk.

The recording medium P on which toner images are transferred by the transfer rolls 207Y, 207M, 207C and 207Bk is further delivered to fixing means 209 to fix. Thereby, a desired image is formed on a recording medium.

As the recording medium, usually, a sheet-like member made of a material relatively high in the flexibility such as a paper recording medium (so-called sheet), a plastic film recording medium (so-called OHP sheet) or the like is used. However, in an image forming apparatus that uses a transfer delivery belt an example of which is shown in FIG. 6, a planar member made of a material relatively high in the rigidity (such as a thick plastic card or the like) as well may be used as a recording medium.

In the above, an image forming apparatus according to an electrophotographic process that uses an endless belt of the exemplary embodiment was described. However, the endless belt of the exemplary embodiment, without restricting to an image forming apparatus according to an electrophotographic process, may be applied as well to a known image forming apparatus (such as an inkjet recording apparatus provided with a sheet delivery endless belt) other than an electrophotographic process in which at least one endless belt is mounted.

EXAMPLES

The invention will be illustrated by the following examples, however, the invention is not limited to these examples at all.

Evaluation of Fixing Belt

Example A1

—Preparation of Polyamic Acid Solution—

In a flask equipped with a stirring rod, thermometer and dropping funnel, 1977.6 g of N-methyl-2-pyrrolidone (hereinafter, abbreviated as "NMP" in some cases) is poured while passing a nitrogen gas dried over phosphorus pentaoxide. Subsequently the solution temperature in the flask is raised up to 60° C., then, 200.2 g (1.0 mol) of 4,4'-diaminodiphenyl ether is added to cause dissolution. After confirmation of dissolution of 4,4'-diaminodiphenyl ether, 294.2 g (1.0 mol) of 3,3',4,4'-biphenyltetracarboxylic dianhydride is added while maintaining the solution temperature at 60° C., and the mixture is dissolved by stirring. After confirmation of dissolution of the tetracarboxylic dianhydride, stirring is further continued while maintaining the solution temperature at 60° C., to carry out a polymerization reaction of a polyamic acid. The reaction is performed for 24 hours, to obtain a polyamic acid solution (PAA-1) having a solid content of 20% by weight.

—Preparation of Polyamic Acid Composition—

Into 500 g of the polyamic acid solution (PAA-1), 0.5 g of polyvinyl-2-pyrrolidone (manufactured by BASF Japan Ltd., Luvitec(R) K17: hereinafter, abbreviated as "PVP" in some cases) as a nonionic polymer is added to cause dissolution. 25.0 g of oxidation-treated carbon black (SPECIAL BLACK 4, manufactured by Degussa, pH 4.0, volatile content: 14.0%: hereinafter, abbreviated as "CB" in some cases) as a dried conductive agent is added, and the mixture is treated in a ball mill for 6 hours to cause dispersion of carbon black, to obtain a CB-dispersed polyamic acid composition (A-1). Its composition is shown below.

—Composition of Obtained Polyamic Acid Composition (A-1)—

Polyamic acid resin: 100 g
NMP: 400 parts by weight
PVP: 0.5 parts by weight
CB: 25.0 parts by weight —Preparation of Base Material—

In the next place, a polyamic acid composition (A-1) is coated on an outer peripheral surface of a cylindrical metal mold (made of stainless steel (SUS), outer diameter: 90 mm, length: 450 mm), thereby a coated film is formed. The polyamic acid composition (A-1) is coated on an outer peripheral surface excluding regions having a width of 20 mm from both ends of the cylindrical metal mold (a region having a width of 410 mm).

On the cylindrical metal mold used, in order to readily peel a base material obtained by burning a coated film off the cylindrical metal mold, a fluorinated mold releasing agent is coated in advance on an outer peripheral surface.

After the coated film is formed, the cylindrical metal mold is dried, while rotating, at 120° C. for 30 min. After drying, in a clean oven, the cylindrical metal mold is burned at 300° C. for 30 min to forward an imidization reaction. Thereafter, the cylindrical metal mold is cooled to room temperature (25° C.) and thereby a cylindrical base material is obtained.

—Surface Treatment of Base Material—

In the next place, the base material is peeled off the cylindrical metal mold and fastened to an outer peripheral surface of a cylindrical resin pipe having a size same as that of the cylindrical metal mold. Thereafter, so as to be able to form a first region and a second region into a pattern (in the example, W1=12.0, W2=8.0 mm and θ=45° are adopted) shown in FIG. 2A according to a surface treatment (hydrolysis treatment), on an outer peripheral surface of an obtained cylindrical base material, a PET mask tape having a width of 5 mm (material; PET (polyethylene terephthalate), manufactured by Nitto Denko Corporation) is adhered. Furthermore, upon hydrolyzing, in order to inhibit a processing liquid from intruding into a gap between an outer peripheral surface of a cylindrical resin pipe and an inner peripheral surface of a base material, a mask tape is adhered so as to straddle both of regions having a width of 5 mm from both end portions of an outer peripheral surface of a base material and an outer peripheral surface of a cylindrical resin pipe exposed along on both end portion sides of an outer peripheral surface of the base material.

Here, a portion of an outer peripheral surface of a base material, in which a mask tape is adhered and the surface treatment is not applied is taken a first region and a portion where a mask tape is not adhered and the surface treatment is applied is taken a second region.

Then, a base material fastened, with a mask tape adhered thereto, on an outer peripheral surface of a cylindrical resin pipe is dipped for 30 min in an aqueous solution of sodium hydroxide (concentration: 5% by weight) heated at 70° C. to hydrolyze. Subsequently, the base material is taken out of an aqueous solution of sodium hydroxide, followed by washing with pure water. In the next place, the base material is dipped for 30 min in an aqueous solution of hydrochloric acid (concentration: 5% by weight) kept at 25° C., followed by taking out of an aqueous solution of hydrochloric acid, further followed by washing with pure water.

At the last, a mask tape adhered on a surface of the base material is peeled, followed by drying in a dryer at 120° C. for 30 min, thereby an endless belt is obtained.

Example A2

Except that, in the surface treatment of a base material, a masking pattern formed on a base material surface is formed into a pattern shown in FIG. 2A (in the exemplary embodiment, W1=8.0 mm, W2=12.0 mm and θ1=45° are adopted), similarly to example A1, a polyimide endless belt is obtained.

Example A3

In the surface treatment of the base material, a base material fastened, with a masking tape adhered thereto, on an outer peripheral surface of a cylindrical resin pipe is dipped for 10 min in an aqueous solution of sodium hydroxide (concentration: 5% by weight) heated at 70° C. under the condition of treat in alkaline solution to hydrolyze, followed by taking out the base material of an aqueous solution of sodium hydroxide, further followed by washing with pure water, still further followed by dipping the base material for 10 min in an aqueous solution of hydrochloric acid (concentration: 5% by weight) kept at 25° C., followed by taking out of the aqueous solution of hydrochloric acid, further followed by washing with pure water, similarly to example A1, a polyimide endless belt is obtained.

Example A4

In the surface treatment of the base material, a masking pattern formed on a base material surface is formed into a pattern shown in FIG. 2A (in the example, W1=8.0 mm, W2=12.0 mm and θ1=45° are adopted), and a base material fastened, with a masking tape adhered thereto, on an outer peripheral surface of a cylindrical resin pipe is dipped for 10 min in an aqueous solution of sodium hydroxide (concentration: 5% by weight) heated at 70° C. under the condition of treat in alkaline solution to hydrolyze, followed by taking out the base material out of an aqueous solution of sodium hydroxide, further followed by washing with pure water, still further followed by dipping the base material for 10 min in an aqueous solution of hydrochloric acid (concentration: 5% by weight) kept at 25° C., followed by taking out of the aqueous solution of hydrochloric acid, further followed by washing with pure water, similarly to example A1, a polyimide endless belt is obtained.

Example A5

Except that, in the surface treatment of a base material, a masking pattern formed on a base material surface is formed into a pattern shown in FIG. 2A (in the example, W1=16.0 mm, W2=4.0 mm and θ1=45° are adopted), similarly to example A1, a polyimide endless belt is obtained.

Example A6

Except that, in the surface treatment of a base material, a masking pattern formed on a base material surface is formed into a pattern shown in FIG. 2A (in the example, W1=4.0 mm, W2=16.0 mm and θ1=45° are adopted), similarly to example A1, a polyimide endless belt is obtained.

Example A7

Similarly to example A1, a belt of a base material is prepared.
—Surface Treatment of Base Material—

In the next place, in order that, with a base material disposed to a cylindrical metal mold, a first region and a second region may be formed into a pattern (in the example, Wa=10.0 mm, Wb=10.0 mm and θ2=45° are adopted) shown in FIG. 2B by means of surface treatment (corona surface treatment), on an outer peripheral surface of an obtained tubular base material, a PET mask tape (material: PET (polyethylene terephthalate), manufactured by Nitto Denko Corporation) having a width of 5 mm is adhered. At the corona treatment, a mask tape is adhered so as to straddle both of regions having a width of 5 mm from both end portions of an outer peripheral surface of a base material and an outer peripheral surface of a cylindrical metal mold exposed along on both end portion sides of an outer peripheral surface of the base material.

Here, a portion where a mask tape is adhered on an outer peripheral surface of a base material and the surface treatment is not applied is taken a first region and a portion where a mask tape is not adhered and the surface treatment is applied is taken a second region.

In the next place, a base material that is, with the masking treatment applied, fastened to an outer peripheral surface of a cylindrical metal mold, while rotating in a circumferential direction at a speed of 5 rpm, is subjected to the corona surface treatment.
Corona surface treatment device: Batch type normal pressure surface treatment device (trade name: 1500 W, manufactured by Electric Works Ltd.)
Applied voltage: 1000 V
Electrode distance: 50 mm
Treatment temperature: 30° C.
Treatment time: 10 min After the surface treatment, the base material is taken out of the cylindrical metal mold and washed with pure water.

At the last, a mask tape adhered on a base material surface is peeled, followed by drying for 30 min in a dryer at 120° C., and, thereby, an endless belt is obtained.

Example A8

Similarly to example A1, a base material belt is prepared.
—Surface Treatment of Base Material—

In the next place, in order that, with a base material disposed to a cylindrical metal mold, a first region and a second region may be formed into a pattern (in the example, θ11=30°, θ12=30°, r1=10.0 mm and d1=13.5 mm are adopted) shown in FIG. 3A by means of surface treatment (normal temperature plasma surface treatment), on an outer peripheral surface of an obtained tubular base material, a PET mask tape (material: PET (polyethylene terephthalate), manufactured by Nitto Denko Corporation) having a width of 5 mm is adhered. At the normal temperature plasma surface treatment, a mask tape is adhered so as to straddle both of regions having a width of 5 mm from both end portions of an outer peripheral surface of a base material and an outer peripheral surface of a cylindrical metal mold exposed along on both end portion sides of an outer peripheral surface of the base material.

Here, a portion where a mask tape is adhered on an outer peripheral surface of a base material and the surface treatment is not applied is taken a first region and a portion where a mask tape is not adhered and the surface treatment is applied is taken a second region.

In the next place, a base material that is, with the masking treatment applied, fastened to an outer peripheral surface of a cylindrical metal mold, while rotating in a circumferential direction at a speed of 5 rpm, is subjected to the normal temperature plasma treatment under the conditions below.
Plasma treatment device: Atmospheric Pressure Plasma Surface-Treating Apparatus (trade name: AP-T02-L, manufactured by Sekisui Chemical Co., Ltd.)
Applied voltage: 10000 V
Electrode distance: 50 mm
Treatment time: 10 min
Treatment temperature: 30° C.
Atmosphere: $N_2$ After the surface treatment is applied, the base material is taken out of the cylindrical metal mold and washed with pure water. At the last, a mask tape adhered on a base material surface is peeled, followed by drying for 30 min in a dryer at 120° C., and, thereby, an endless belt is obtained.

Example A9

Similarly to example A1, a base material belt is prepared.
—Surface Treatment of Base Material—

In the next place, in order that, with a base material disposed to a cylindrical metal mold, a first region and a second region may be formed into a pattern (in the example, A1=10.0 mm, B1=20.0 mm, X1=25 mm and Y1=5.0 mm are adopted) shown in FIG. 4A by means of surface treatment (UV-irradiation surface treatment), on an outer peripheral surface of an obtained tubular base material, a PET mask tape (material: PET (polyethylene terephthalate), manufactured by Nitto Denko Corporation) having a width of 5 mm is adhered. At the UV-ray surface treatment, a mask tape is adhered so as to straddle both of regions having a width of 5 mm from both end portions of an outer peripheral surface of a base material and an outer peripheral surface of a cylindrical metal mold exposed along on both end portion sides of an outer peripheral surface of the base material.

Here, a portion where a mask tape is adhered on an outer peripheral surface of a base material and the surface treatment is not applied is taken a first region and a portion where a mask tape is not adhered and the surface treatment is applied is taken a second region.

In the next place, a base material that is, with the masking treatment applied, fastened to an outer peripheral surface of a cylindrical metal mold, while rotating in a circumferential direction at a speed of 5 rpm, is subjected to the normal temperature plasma surface treatment under the conditions shown below.

UV-ray device: UV-Ray Surface Treatment Apparatus (trade name: PL2003-N, manufactured by Sen Lights Co. Ltd.)
Light Source: 100 W Low Pressure Mercury Lamp
Electrode distance: 50 mm
Treatment time: 10 min
Treatment temperature: 30° C.
Atmosphere: $N_2$ After the surface treatment is applied, the base material is taken out of the cylindrical metal mold and washed with pure water. At the last, a mask tape adhered on a base material surface is peeled, followed by drying for 30 min in a dryer at 120° C., and, thereby, an endless belt is obtained.

Comparative Example A1

Except that a surface treatment of a base material is not applied, similarly to example A1, an endless belt is obtained.

Comparative Example A2

Except that, in the surface treatment of a base material, a masking pattern formed on a base material surface is formed into a pattern shown in FIG. 2A (in the comparative example, W1=54.0 mm, W2=6.0 mm and θ1=45° are adopted), similarly to example A1, a polyimide endless belt is obtained.

Comparative Example A3

Except that, in the surface treatment of a base material, a masking pattern formed on a base material surface is formed into a pattern shown in FIG. 2A (in the comparative example, W1=6.0 mm, W2=54.0 mm and θ1=45° are adopted), similarly to example A1, a polyimide endless belt is obtained.

(Evaluation of Various Characteristics of Endless Belt)

Of resulted endless belts, contact angles of the first and second regions, an imidization rate, ten-point average roughness Rz and a belt film thickness are measured. Results thereof are shown in Tables 1 and 2 together with an area ratio of the first and second regions.

The belt film thickness is measured according to a method shown below. Furthermore, a contact angle of an endless belt of comparative example A1 to which the surface treatment is not applied is measured at arbitrary ten points of an outer peripheral surface and an average value thereof is used.

—Measurement of Belt Film Thickness—

In belt film thickness measurement, an eddy current type film thickness meter (trade name: CTR-1500E, manufactured by Saniko Electronic K. K.) is used. The first and second regions, respectively, are measured 5 times and average values thereof are taken as belt film thicknesses.

Furthermore, an endless belt of comparative example A1 to which the surface treatment is not applied is measured at arbitrary ten points of an outer peripheral surface and an average value thereof is used.

(Image Formation Test)

As a fixing belt of an external fixing, unit provided with a fixing belt (a fixing unit of DOCCENTRE COLOR 400CP (trade name, manufactured by Fuji Xerox Co., Ltd.)), each of endless belts obtained according to the respective examples and comparative examples is attached.

Subsequently, with a process speed and a fixing temperature, respectively, set at 20 mm/s and 150° C., A4 size sheets (trade name: C2 PAPER, manufactured by Fuji Xerox Co., Ltd.) on which an un-fixed image (halftone image of image density 50%) is formed in advance are fixed under a high temperature and high humidity environment (28° C. and 85% RH) and a low temperature and low humidity environment (10° C. and 15% RH), respectively, and resulting images are evaluated of density unevenness and mottle defect.

Furthermore, after the tests, with plain A4 size sheets (trade name: C2 PAPER, manufactured by Fuji Xerox Co., Ltd.), the paper clogging test is carried out. Results are shown in Tables 1 and 2.

As the un-fixed images, by use of an image forming apparatus (trade name: DOCCENTRE COLOR 400CP, manufactured by Fuji Xerox Co., Ltd.) therefrom a fixing unit is removed, a cyan halftone un-fixed image and a magenta halftone un-fixed image are formed respectively.

TABLE 1

| | | Example A1 | Example A2 | Example A3 | Example A4 | Example A5 | Example A6 |
|---|---|---|---|---|---|---|---|
| | Surface treatment | Hydrolysis | Hydrolysis | Hydrolysis | Hydrolysis | Hydrolysis | Hydrolysis |
| Contact angle (°) | Contact angle of first region θ(1) | 85 | 85 | 85 | 85 | 85 | 85 |
| | Contact angle of second region θ(2) | 63 | 63 | 77 | 77 | 63 | 63 |
| | \|θ(1) − θ(2)\| | 22 | 22 | 8 | 8 | 22 | 22 |
| Area ratio | First region:second region | 60:40 | 40:60 | 60:40 | 40:60 | 80:20 | 20:80 |
| Shapes and layout patterns of first and second regions | | FIG. 2(A) W1 = 12.0 mm, W2 = 8.0 mm, θ1 = 45° | FIG. 2(A) W1 = 8.0 mm, W2 = 12.0 mm, θ1 = 45° | FIG. 2(A) W1 = 12.0 mm, W2 = 8.0 mm, θ1 = 45° | FIG. 2(A) W1 = 8.0 mm, W2 = 12.0 mm, θ1 = 45° | FIG. 2(A) W1 = 16.0 mm, W2 = 4.0 mm, θ1 = 45° | FIG. 2(A) W1 = 4.0 mm, W2 = 16.0 mm, θ1 = 45° |
| Imidization rate | First region:second region I(1) | 95 | 95 | 95 | 95 | 95 | 95 |
| | Imidization rate of first region I(2) | 60 | 60 | 75 | 75 | 60 | 60 |
| | \|I(1) − I(2)\| | 35 | 35 | 20 | 20 | 35 | 35 |
| Ten-point average roughness Rz (μm) | Rz(1) of first region | 0.55 | 0.55 | 0.55 | 0.55 | 0.55 | 0.55 |
| | Rz(2) of second region | 0.55 | 0.55 | 0.55 | 0.55 | 0.55 | 0.55 |
| | Rz(2)/Rz(1) | 1.00 | 1.00 | 1.00 | 1.00 | 1.00 | 1.00 |
| Belt film thickness (μm) | First region | 100 | 100 | 100 | 100 | 100 | 100 |
| | Second region | 100 | 100 | 100 | 100 | 100 | 100 |
| Paper clogging | Low temperature and low humidity (10 C.° 15 RH %) | A | A | B | B | B | B |

TABLE 1-continued

|  |  | Example A1 | Example A2 | Example A3 | Example A4 | Example A5 | Example A6 |
|---|---|---|---|---|---|---|---|
| Density unevenness | High temperature and high humidity (28 C.° 85 RH %) | A | A | A | A | A | A |
|  | Low temperature and low humidity (10 C.° 15 RH %) | A | A | B | B | B | B |
| Mottle defect | High temperature and high humidity (28 C.° 85 RH %) | A | A | A | A | A | A |
|  | Low temperature and low humidity (10 C.° 15 RH %) | A | A | B | B | B | B |
|  | High temperature and high humidity (28 C.° 85 RH %) | A | A | A | A | A | A |

TABLE 2

|  |  | Example A7 | Example A8 | Example A9 | Comparative Example A1 | Comparative Example A2 | Comparative Example A3 |
|---|---|---|---|---|---|---|---|
|  | Surface treatment | Corona discharge surface treatment | Plasma treatment | UV-treatment | None | Hydrolysis | Hydrolysis |
| Contact angle (°) | Contact angle of first region θ(1) | 85 | 85 | 85 | 85 | 85 | 85 |
|  | Contact angle of second region θ(2) | 65 | 65 | 65 | — | 63 | 63 |
|  | \|θ(1) − θ(2)\| | 20 | 20 | 20 | — | 22 | 22 |
| Area ratio | First region:second region | 50:50 | 50:50 | 77:23 | — | 90:10 | 10:90 |
|  | Shapes and layout patterns of first and second regions | FIG. 2(B) Wa = 10.0 mm, Wb = 10.0 mm, θ2 = 45° | FIG. 3(A) r1 = 10.0 mm, d1 = 13.5 mm, θ11 = 30°, θ12 = 30° | FIG. 4(A) A1 = 10.0 mm, B1 = 20.0 mm, X1 = 25.0 mm, Y1 = 5.0 mm | — | FIG. 2(A) W1 = 54.0 mm, W2 = 6.0 mm, θ1 = 45° | FIG. 2(A) W1 = 6.0 mm, W2 = 54.0 mm, θ1 = 45° |
| Imidization rate | First region:second region I(1) | 85 | 85 | 85 | 95 | 95 | 95 |
|  | Imidization rate of first region I(2) | 65 | 65 | 65 | — | 63 | 63 |
|  | \|I(1) − I(2)\| | 20 | 20 | 20 | — | 22 | 22 |
| Ten-point average roughness Rz (μm) | Rz(1) of first region | 0.55 | 0.55 | 0.55 | 0.55 | 0.55 | 0.55 |
|  | Rz(2) of second region | 0.60 | 0.60 | 0.60 | — | 0.55 | 0.55 |
|  | Rz(2)/Rz(1) | 0.92 | 0.92 | 0.92 | — | 1.00 | 1.00 |
| Belt film thickness (μm) | First region | 100 | 100 | 100 | 100 | 100 | 100 |
|  | Second region | 100 | 100 | 100 | — | 100 | 100 |
| Paper clogging | Low temperature and low humidity (10 C.° 15 RH %) | B | B | B | D | D | D |
|  | High temperature and high humidity (28 C.° 85 RH %) | A | A | A | B | B | B |
| Density unevenness | Low temperature and low humidity (10 C.° 15 RH %) | B | B | B | B | B | B |
|  | High temperature and high humidity (28 C.° 85 RH %) | A | A | A | B | B | B |
| Mottle defect | Low temperature and low humidity (10 C.° 15 RH %) | B | B | B | B | B | B |
|  | High temperature and high humidity (28 C.° 85 RH %) | A | A | A | B | B | B |

In tables 1 and 2, evaluation methods and evaluation criteria of the density unevenness, mottle defect and paper clogging are as shown below.

—Density Unevenness—

The density unevenness of each of resulted images is evaluated according to procedures and criteria shown below.

An A4 sheet on which an image is output is divided into 25 divisions by dividing into 5 equivalent portions in a longer direction and into 5 equivalent portions in a shorter direction to prepare sample pieces. The printing density of each of the test pieces is measured by use of a portable integrating sphere spectrophotometer (trade name: SP64, manufactured by Color Techno-System K. K.). The luminosity L of each of the obtained samples is measured. A difference of the maximum value and the minimum value of the L values of 25 test pieces is taken ΔL.

A: The density unevenness is not confirmed: ΔL is less than 0.2.

B: The density unevenness is confirmed. However, it is not a problematic level: ΔL is 0.2 or more and less than 0.5.

D: The density unevenness is obviously confirmed: ΔL is 0.5 or more.

—Mottle Defect—

An obtained image is visually observed to evaluate the mottle defect according to criteria shown below. An A4 sheet on which an image is output is divided into 5 equivalent portions in a longer direction and into 5 equivalent portions in a shorter direction to prepare 25 sample pieces. Test pieces where a mottle having a magnitude of 1 mm or more is found one or more and one where a mottle having a magnitude of less than 1 mm is found at least 5 are extracted.

A: The number of extracted test pieces is less than 2.
B: The number of extracted test pieces is two or more and less than 5.
D: The number of extracted test pieces is 5 or more.

—Paper Clogging—

Here, 1000 sheets of white A4 size sheets (C2 PAPER: trade name, manufactured by Fuji Xerox Co., Ltd.) are continuously passed at a process speed of 10 mm/s at 150° C. and the number of clogged sheets in the continuous pass test is counted. The test is carried out under a high temperature and high humidity environment (28° C. and 85% RH) and a low temperature and low humidity environment (10° C. and 15% RH), respectively.

A: The number of clogged paper is less than 5
B: The number of clogged paper is 5 or more and less than 10
C: The number of clogged paper is 10 or more and less than 20
D: The number of clogged paper is 20 or more Evaluation of Transfer Delivery Belt Example E1

Preparation of Polyamic Acid Solution

In a flask equipped with a stirring rod, thermometer and dropping funnel, 1977.6 g of N-methyl-2-pyrrolidone (hereinafter, abbreviated as "NMP" in some cases) is poured while passing a nitrogen gas dried over phosphorus pentaoxide. Subsequently the solution temperature in the flask is raised up to 60° C., then, 200.2 g (1.0 mol) of 4,4'-diaminodiphenyl ether is added to cause dissolution. After confirmation of dissolution of 4,4'-diaminodiphenyl ether, 294.2 g (1.0 mol) of 3,3',4,4'-biphenyltetracarboxylic dianhydride is added while maintaining the solution temperature at 60° C., and the mixture is dissolved by stirring. After confirmation of dissolution of the tetracarboxylic dianhydride, stirring is further continued while maintaining the solution temperature at 60° C., to carry out a polymerization reaction of a polyamic acid. The reaction is performed for 24 hours, to obtain a polyamic acid solution (PAA-1) having a solid content of 20% by weight.

—Preparation of Polyamic Acid Composition—

Into 500 g of the polyamic acid solution (PAA-1), 0.5 g of polyvinyl-2-pyrrolidone (manufactured by BASF Japan Ltd., Luvitec® K17: hereinafter, abbreviated as "PVP" in some cases) as a nonionic polymer is added to cause dissolution. 25.0 g of oxidation-treated carbon black (SPECIAL BLACK 4, manufactured by Degussa, pH 4.0, volatile content: 14.0%: hereinafter, abbreviated as "CB" in some cases) as a dried conductive agent is added, and the mixture is treated in a ball mill for 6 hours to cause dispersion of carbon black, to obtain a CB-dispersed polyamic acid composition (A-1). Its composition is shown below.

—Composition of Obtained Polyamic Acid Composition (A-1)—

Polyamic acid resin: 100 g
NMP: 400 parts by weight
PVP: 0.5 parts by weight
CB: 25.0 parts by weight —Preparation of Base Material—

In the next place, a polyamic acid composition (A-1) is coated on an outer peripheral surface of a cylindrical metal mold (made of stainless steel (SUS), outer diameter: 90 mm, length: 450 mm), thereby a coated film is formed. The polyamic acid composition (A-1) is coated on an outer peripheral surface excluding regions having a width of 20 mm from both ends of the cylindrical metal mold (region having a width of 410 mm).

On the cylindrical metal mold used, in order to enable to readily peel a base material obtained by burning a coated film off the cylindrical metal mold, a fluorinated mold releasing agent is coated in advance on an outer peripheral surface.

After the coated film is formed, the cylindrical metal mold is dried, while rotating, at 120° C. for 30 min. After drying, in a cl for 30 min to forward an imidization reaction. Thereafter, the cylindrical metal mold is left to cool to room temperature (25° C.), and thereby a cylindrical base material is obtained.

—Surface Treatment of Base Material—

In the next place, the base material is peeled off the cylindrical metal mold and fastened to an outer peripheral surface of a cylindrical resin pipe having a size same as that of the cylindrical metal mold. Thereafter, so that a first region and a second region may be formed into a pattern (in the example, W1=21.0, W2=9.0 mm and θ1=45° are adopted) shown in FIG. 2A according to a surface treatment (hydrolysis treatment), on an outer peripheral surface of an obtained tubular base material, a PET mask tape having a width of 5 mm (material; PET (polyethylene terephthalate), manufactured by Nitto Denko Corporation) is adhered. Furthermore, upon hydrolyzing, in order to inhibit a processing liquid from intruding into a gap between an outer peripheral surface of a cylindrical resin pipe and an inner peripheral surface of a base material, a mask tape is adhered so as to straddle both of regions having a width of 5 mm from both end portions of an outer peripheral surface of a base material and an outer peripheral surface of a cylindrical resin pipe exposed along on both end portion sides of an outer peripheral surface of the base material.

Here, a portion where a mask tape is adhered on an outer peripheral surface of the ba se material and the surface treatment is not applied is taken a first region and a portion where a mask tape is not adhered and the surface treatment is applied is taken a second region.

In the next place, a base material that is fastened, with a mask tape applied thereto, to an outer peripheral surface of a cylindrical resin pipe is dipped for 15 min in an aqueous solution of sodium hydroxide (concentration: 5% by weight) heated at 70° C. to hydrolyze. Subsequently, the base material is taken out of an aqueous solution of sodium hydroxide and washed with pure water. Then, the base material is dipped for 30 min in an aqueous solution of hydrochloric acid (concentration: 5% by weight) kept at 25° C., followed by taking out of an aqueous solution of hydrochloric acid, further followed by washing with pure water.

At the last, a mask tape adhered to a surface of the base material is peeled, followed by drying in a dryer at 120° C. for 30 min, thereby an endless belt is obtained.

Example B2

Except that, in the surface treatment of a base material, a masking pattern formed on a base material surface is formed into a pattern shown in FIG. 2A (in the example W1=9.0 mm, W2=21.0 mm and θ1=45° are adopted), similarly to example B1, a polyimide endless belt is obtained.

A base material that is fastened, with a mask applied thereto, to an outer peripheral surface of a cylindrical resin pipe is dipped for 30 min in an aqueous solution of sodium hydroxide (concentration: 5% by weight) heated at 70° C. to hydrolyze, subsequently, the base material is taken out of an aqueous solution of sodium hydroxide and washed with pure water, then, the base material is dipped for 10 min in an aqueous solution of hydrochloric acid (concentration: 5% by weight) kept at 25° C., taken out of an aqueous solution of hydrochloric acid and washed with pure water, similarly to example B1, a polyimide endless belt is obtained.

Example B3

In the surface treatment of a base material, a base material that is fastened, with a mask tape applied thereto, to an outer peripheral surface of a cylindrical resin pipe is dipped for 10 min in an aqueous solution of sodium hydroxide (concentration: 5% by weight) heated at 70° C. to hydrolyze, subsequently, the base material is taken out of an aqueous solution of sodium hydroxide and washed with pure water, then, the base material is dipped for 10 min in an aqueous solution of hydrochloric acid (concentration: 5% by weight) kept at 25° C., taken out of an aqueous solution of hydrochloric acid and washed with pure water, similarly to example B1, a polyimide endless belt is obtained.

Example B4

In the surface treatment of a base material, a masking pattern formed on a base material surface is formed into a pattern shown in FIG. 2A (in the example, W1=9.0 mm, W2=21.0 mm and θ1=45° are adopted), a base material that is fastened, with a mask tape applied thereto, on an outer peripheral surface of a cylindrical resin pipe is dipped for 10 min in an aqueous solution of sodium hydroxide (concentration: 5% by weight) heated at 70° C. to hydrolyze, subsequently, the base material is taken out of an aqueous solution of sodium hydroxide and washed with pure water, then, the base material is dipped for 10 min in an aqueous solution of hydrochloric acid (concentration: 5% by weight) kept at 25° C., taken out of an aqueous solution of hydrochloric acid, and washed with pure water, similarly to example B1, a polyimide endless belt is obtained.

Example B5

In the surface treatment of a base material, a masking pattern formed on a base material surface is formed into a pattern shown in FIG. 2A (in the example, W1=24.0 mm, W2=6.0 mm and θ1=45° are adopted), a base material that is fastened, with a mask tape applied thereto, to an outer peripheral surface of a cylindrical resin pipe is dipped for 30 min in an aqueous solution of sodium hydroxide (concentration: 5% by weight) heated at 70° C. to hydrolyze, subsequently, the base material is taken out of an aqueous solution of sodium hydroxide and washed with pure water, then, the base material is dipped for 10 min in an aqueous solution of hydrochloric acid (concentration: 5% by weight) kept at 25° C., taken out of an aqueous solution of hydrochloric acid and washed with pure water, similarly to example B1, a polyimide endless belt is obtained.

Example B6

In the surface treatment of a base material, a masking pattern formed on a base material surface is formed into a pattern shown in FIG. 2A (in the example, W1=6.0 mm, W2=24.0 mm and θ1=45° are adopted), a base material that is fastened, with a mask tape applied thereto, to an outer peripheral surface of a cylindrical resin pipe is dipped for 30 min in an aqueous solution of sodium hydroxide (concentration: 5% by weight) heated at 70° C. to hydrolyze, subsequently, the base material is taken out of an aqueous solution of sodium hydroxide and washed with pure water, then, the base material is dipped for 10 min in an aqueous solution of hydrochloric acid (concentration: 5% by weight) kept at 25° C., taken out of an aqueous solution of hydrochloric acid, and washed with pure water, similarly to example B1, a polyimide endless belt is obtained.

Comparative Example B1

Except that a base material is not surface treated, similarly to example B1, an endless belt is obtained.

Comparative Example B2

In the surface treatment of a base material, a masking pattern formed on a base material surface is formed into a pattern (in the exemplary embodiment, W1=54.0 mm, W2=6.0 mm and θ1=45° are adopted) shown in FIG. 2A.

A base material that is fastened, with a mask tape applied thereto, on an outer peripheral surface of a cylindrical resin pipe is dipped for 10 min in an aqueous solution of sodium hydroxide (concentration: 5% by weight) heated at 70° C. to hydrolyze, subsequently, the base material is taken out of an aqueous solution of sodium hydroxide and washed with pure water, then, the base material is dipped for 10 min in an aqueous solution of hydrochloric acid (concentration: 5% by weight) kept at 25° C., taken out of an aqueous solution of hydrochloric acid and washed with pure water, similarly to example B1, a polyimide endless belt is obtained.

Comparative Example B3

Except that, in the surface treatment of a base material, a masking pattern formed on a base material surface is formed into a pattern (in the exemplary embodiment, W1=6.0 mm, W2=54.0 mm and θ1=45° are adopted) shown in FIG. 2A, similarly to example A1, a polyimide endless belt is obtained.

A base material that is fastened, with a mask tape applied thereto, on an outer peripheral surface of a cylindrical resin pipe is dipped for 10 min in an aqueous solution of sodium hydroxide (concentration: 5% by weight) heated at 70° C. to hydrolyze, subsequently, the base material is taken out of an aqueous solution of sodium hydroxide and washed with pure water, then, the base material is dipped for 10 min in an aqueous solution of hydrochloric acid (concentration: 5% by weight) kept at 25° C., taken out of an aqueous solution of hydrochloric acid and washed with pure water, similarly to example B1, a polyimide endless belt is obtained.

(Evaluation of Various Characteristics of Endless Belt>

Of resulted endless belts, similarly to the case shown in Tables 1 and 2, contact angles of the first and second regions, an imidization rate, ten-point average roughness Rz, a belt film thickness and the surface resistivity are measured. Results thereof are shown in Table3 together with an area ratio of the first and second regions. The surface resistivity is measured according to a method shown below.

—Surface Resistivity—

The surface resistivity is obtained by measuring of an outer circumference surface of an endless belt. However, the surface resistivity of an endless belt that is surface treated so as to form a first region and a second region on an outer peripheral surface is obtained in such a manner that a sample belt where an entire surface of an outer peripheral surface is surface treated similarly when an endless belt is prepared and a sample belt where an outer peripheral surface is not at all surface treated different from when an endless belt is prepared, respectively, are prepared and outer peripheral surfaces of the sample belts are measured to obtain.

In measurement, with a sample belt set to a circular electrode (a UR probe of Highrester IP (trade name, manufactured by Mitsubishi Chemical Co., Ltd.): an outer diameter Φ of a columnar electrode C: 16 mm, an inner diameter Φ of a ring-like electrode portion: 30 mm, and an outer diameter Φ of the ring-like electrode portion: 40 nm), under an environment of 22° C./55% RH, with a voltage applied at three levels of 10 V, 100 V and 1000 V, current values at 10 sec after a voltage is applied are measured by use of R8340A (trade name, manufactured by Advantest Corp.), from the current values the surface resistivity (ρs) of outer peripheral surface/inner peripheral surface of an endless belt is calculated, and, from the value, a normal logarithmic value of the surface resistivity ($\log(\rho s)(\log\Omega)$) is calculated. Specifically, the surface resistivity may be measured according to JIS K6911 (1995) using the above-mentioned cylindrical electrode as an electrode for measurement.

Figure 7A:
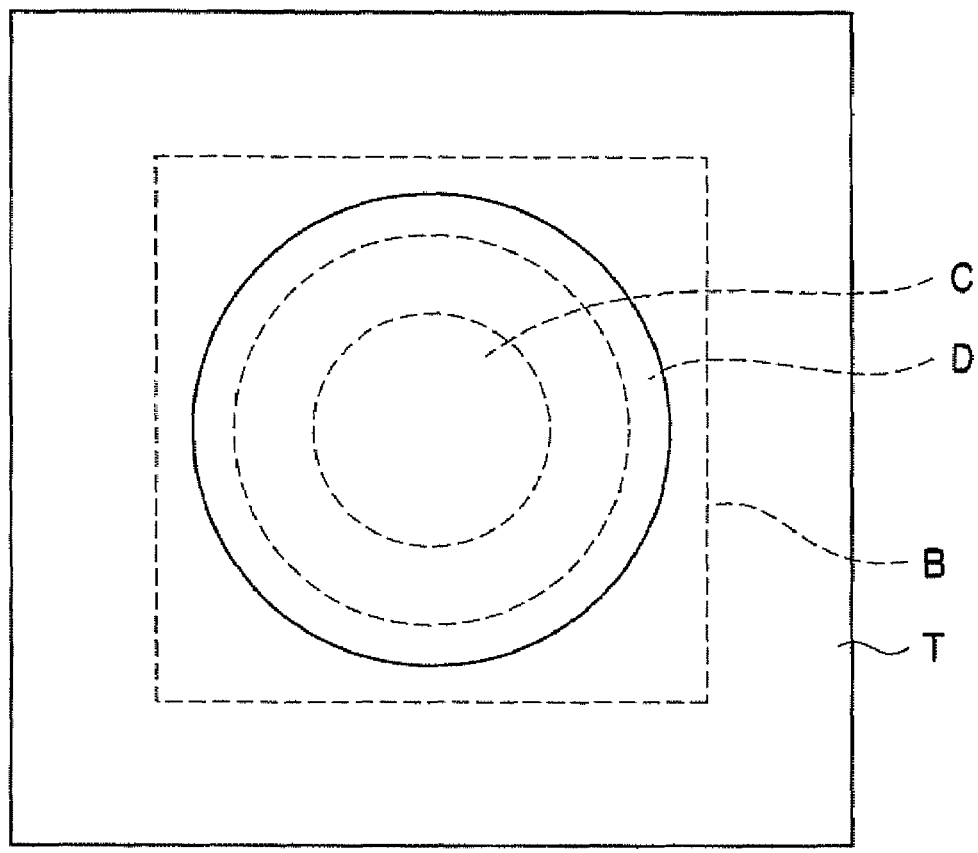
FIGS. 7A and 7B are rough schematic diagrams for explaining a measurement method of the surface resistivity.
Figure 7B:
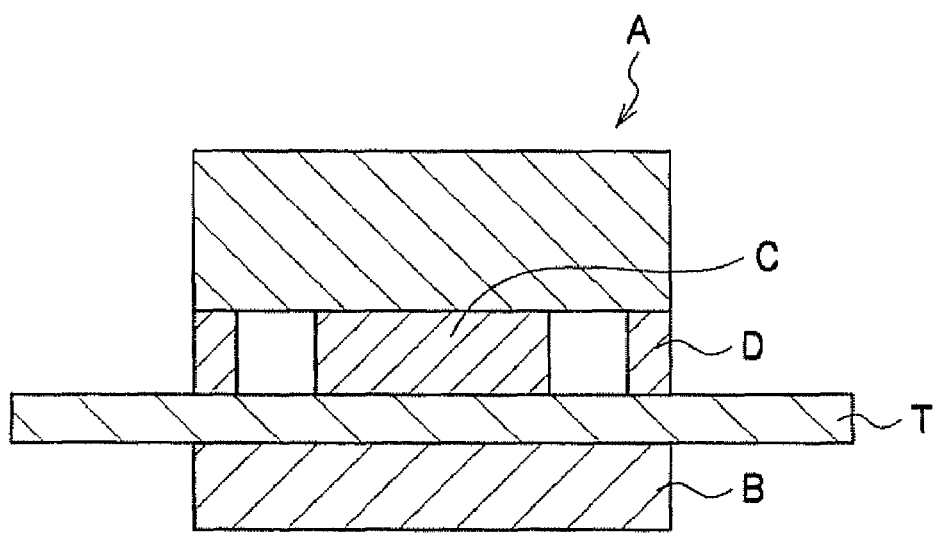

The method for measuring surface resistivity is described using drawings. FIGS. 7A and 7B are rough schematic diagrams explaining a measurement method of the surface resistivity, FIG. 7A is a rough plan view of a circular electrode, and FIG. 7B is a rough sectional view of a circular electrode. The cylindrical electrode shown in FIG. 7A and FIG. 7B has a first voltage application electrode A and a plate insulator B. The first voltage application electrode A has a cylindrical electrode part C and a cylindrical ring-shaped electrode D having an inner diameter larger than the outer diameter of the cylindrical electrode C and surrounding the cylindrical electrode part C with constant clearance. An endless belt T is sandwiched between the plate insulator B and the cylindrical electrode C and the ring-shaped electrode D of the first voltage application electrode A, and voltage V (V) is applied between the cylindrical electrode C and the ring-shaped electrode D of the first voltage application electrode A and current I (A) flowing in this operation is measured, and the surface resistivity $\rho s(\Omega)$ of the belt T may be calculated by the following formula (4).

Here, in the following formula (1), d (mm) represents the outer diameter of the cylindrical electrode C and D (mm) represents the inner diameter of the ring-shaped electrode D, and π represents circular constant.

In measurement of surface resistivity, current I (A) is measured 10 seconds after application of voltage V (V).

$$\rho s = \pi \times (D+d)/(D-d) \times (V/I) \qquad \text{Formula (4):}$$

(Image Forming Test)

As a transfer delivery belt of an image forming apparatus provided with a transfer delivery belt (trade name: A-COLOR, manufactured by Fuji Xerox Co., Ltd.), an endless belt obtained in each of the respective examples and comparative examples is attached.

Subsequently, with a transfer current set at 20 μA, a process speed at 50 mm/sec and a fixing temperature at 150° C. and with an A4 size sheet (trade name: C2 sheet, manufactured by Fuji Xerox Co., Ltd.), under a high temperature and high humidity environment (28° C. and 85% RH) and a low temperature and low humidity environment (10° C. and 15% RH), cyan and magenta halftone images (image density: 50%) are formed, and the density unevenness and mottle defect of resulting images are evaluated.

Furthermore, after the tests, with white A4 size sheets (trade name; C2 PAPER, manufactured by Fuji Xerox Co., Ltd.), the paper clogging test is carried out. Results are shown in Table 3.

TABLE 3

| | | Example B1 | Example B2 | Example B3 | Example B4 | Example B5 |
|---|---|---|---|---|---|---|
| Surface treatment | | Hydrolysis | Hydrolysis | Hydrolysis | Hydrolysis | Hydrolysis |
| Contact angle (°) | Contact angle of first region θ(1) | 85 | 85 | 85 | 85 | 85 |
| | Contact angle of second region θ(2) | 72 | 63 | 77 | 77 | 62 |
| | \|θ(1) − θ(2)\| | 13 | 23 | 8 | 8 | 23 |
| Area ratio | First region:second region | 70:30 | 30:70 | 70:30 | 30:70 | 80:20 |
| Shapes and layout patterns of first and second regions | | FIG. 2A W1 = 21.0 mm, W2 = 9.0 mm, θ1 = 45° | FIG. 2A W1 = 9.0 mm, W2 = 21.0 mm, θ1 = 45° | FIG. 2A W1 = 21.0 mm, W2 = 9.0 mm, θ1 = 45° | FIG. 2A W1 = 9.0 mm, W2 = 21.0 mm, θ1 = 45° | FIG. 2A W1 = 24.0 mm, W2 = 6.0 mm, θ1 = 45° |
| Imidization rate | First region:second region I(1) | 95 | 95 | 95 | 95 | 95 |
| | Imidization rate of first region I(2) | 75 | 60 | 72 | 72 | 60 |
| | \|I(1) − I(2)\| | 20 | 35 | 23 | 23 | 35 |
| Ten-point average roughness Rz (μm) | Rz(1) of first region | 0.55 | 0.55 | 0.55 | 0.55 | 0.55 |
| | Rz(2) of second region | 0.55 | 0.55 | 0.55 | 0.55 | 0.55 |
| | Rz(2)/Rz(1) | 1.00 | 1.00 | 1.00 | 1.00 | 1.00 |
| Belt film thickness (μm) | First region | 100 | 100 | 100 | 100 | 100 |
| | Second region | 100 | 100 | 100 | 100 | 100 |
| Common logarithmic value of surface resistivity (Ω · cm) | Under application of 10 V | 11.0 | 11.0 | 11.0 | 11.0 | 11.0 |
| | Under application of 100 V | 11.0 | 11.0 | 11.0 | 11.0 | 11.0 |
| | Under application of 1000 V | 11.0 | 11.0 | 11.0 | 11.0 | 11.0 |
| Paper clogging | Low temperature and low humidity (10 C.° 15 RH %) | A | A | A | A | A |
| | High temperature and high humidity (28 C.° 85 RH %) | A | A | A | A | A |
| Density unevenness | Low temperature and low humidity (10 C.° 15 RH %) | A | A | A | A | A |

TABLE 3-continued

| | | Example B6 | Comparative Example B1 | Comparative Example B2 | Comparative Example B3 |
|---|---|---|---|---|---|
| Mottle defect | High temperature and high humidity (28 C.° 85 RH %) | A | A | A | A |
| | Low temperature and low humidity (10 C.° 15 RH %) | A | A | A | A |
| | High temperature and high humidity (28 C.° 85 RH %) | A | A | A | A |

| | | Example B6 | Comparative Example B1 | Comparative Example B2 | Comparative Example B3 |
|---|---|---|---|---|---|
| | Surface treatment | Hydrolysis | none | Hydrolysis | Hydrolysis |
| Contact angle (°) | Contact angle of first region θ(1) | 85 | 85 | 85 | 85 |
| | Contact angle of second region θ(2) | 62 | | 63 | 63 |
| | \|θ(1) − θ(2)\| | 23 | — | 23 | 23 |
| Area ratio | First region:second region | 30:70 | — | 90:10 | 10:90 |
| Shapes and layout patterns of first and second regions | | FIG. 2A W1 = 6.0 mm, W2 = 24.0 mm, θ1 = 45° | — | FIG. 2A W1 = 54.0 mm, W2 = 6.0 mm, θ1 = 45° | FIG. 2A W1 = 6.0 mm, W2 = 54.0 mm, θ1 = 45° |
| Imidization rate | First region:second region I(1) | 95 | 95 | 95 | 95 |
| | Imidization rate of first region I(2) | 60 | | 60 | 60 |
| | \|I(1) − I(2)\| | 35 | — | 35 | 35 |
| Ten-point average roughness Rz (μm) | Rz(1) of first region | 0.55 | 0.55 | 0.55 | 0.55 |
| | Rz(2) of second region | 0.55 | | 0.55 | 0.55 |
| | Rz(2)/Rz(1) | 1.00 | — | 1.00 | 1.00 |
| Belt film thickness (μm) | First region | 100 | 100 | 100 | 100 |
| | Second region | 100 | | 100 | 100 |
| Common logarithmic value of surface resistivity (Ω·cm) | Under application of 10 V | 11.0 | 11.0 | 11.0 | 11.0 |
| | Under application of 100 V | 11.0 | 11.0 | 11.0 | 11.0 |
| | Under application of 1000 V | 11.0 | 11.0 | 11.0 | 11.0 |
| Paper clogging | Low temperature and low humidity (10 C.° 15 RH %) | A | D | D | D |
| | High temperature and high humidity (28 C.° 85 RH %) | A | B | B | B |
| Density unevenness | Low temperature and low humidity (10 C.° 15 RH %) | A | A | A | A |
| | High temperature and high humidity (28 C.° 85 RH %) | A | A | A | A |
| Mottle defect | Low temperature and low humidity (10 C.° 15 RH %) | A | A | A | A |
| | High temperature and high humidity (28 C.° 85 RH %) | A | A | A | A |

In table 3, the evaluation methods and evaluation criteria of the density unevenness and mottle defect are same as that mentioned above. Furthermore, the evaluation method and evaluation criteria of the paper clogging are as follows.

—Paper Clogging—

Here, 10000 sheets of white A4 size sheets (trade name: C2 PAPER, manufactured by Fuji Xerox Co., Ltd.) are continuously passed at a transfer current of 200 μA, a process speed of 50 m m/s and a fixing temperature of 150° C., and the number of clogged sheets at a transfer delivery belt position in the continuous pass test is counted. The test is carried out under a high temperature and high humidity environment (28° C. and 85% RH) and a low temperature and low humidity environment (10° C. and 15% RH), respectively.
A: The number of clogged paper is less than 5
B: The number of clogged paper is 5 or more and less than 10
C: The number of clogged paper is 10 or more and less than 20
D: The number of clogged paper is 20 or more

[Evaluation of Intermediate Transfer Belt]

Example C1

—Preparation of Polyamic Acid Solution—

In a flask equipped with a stirring rod, thermometer and dropping funnel, 1977.6 g of N-methyl-2-pyrrolidone (hereinafter, abbreviated as "NMP" in some cases) is poured while passing a nitrogen gas dried over phosphorus pentaoxide. Subsequently the solution temperature in the flask is raised up to 60° C., then, 200.2 g (1.0 mol) of 4,4'-diaminodiphenyl ether is added to cause dissolution. After confirmation of dissolution of 4,4'-diaminodiphenyl ether, 294.2 g (1.0 mol) of 3,3',4,4'-biphenyltetracarboxylic dianhydride is added while maintaining the solution temperature at 60° C., and the mixture is dissolved by stirring. After confirmation of dissolution of the tetracarboxylic dianhydride, stirring is further continued while maintaining the solution temperature at 60° C., to carry out a polymerization reaction of a polyamic acid. The reaction is performed for 24 hours, to obtain a polyamic acid solution (PAA-1) having a solid content of 20% by weight.

—Preparation of Polyamic Acid Composition—

Into 500 g of the polyamic acid solution (PAA-1), 0.5 g of polyvinyl-2-pyrrolidone (manufactured by BASF Japan Ltd., Luvitec® K17: hereinafter, abbreviated as "PVP" in some cases) as a nonionic polymer is added to cause dissolution. 25.0 g of oxidation-treated carbon black (SPECIAL BLACK 4, manufactured by Degussa, pH 4.0, volatile content: 14.0%: hereinafter, abbreviated as "CB" in some cases) as a dried conductive agent is added, and the mixture is treated in a ball mill for 6 hours to cause dispersion of carbon black, to obtain a CB-dispersed polyamic acid composition (A-1). Its composition is shown below.

—Composition of Obtained Polyamic Acid Composition (A-1)—

Polyamic acid resin: 100 g
NMP: 400 parts by weight
PVP: 0.5 parts by weight
CB: 25.0 parts by weight —Preparation of Base Material—

In the next place, a polyamic acid composition (A-1) is coated on an outer peripheral surface of a cylindrical metal mold (made of stainless steel (SUS), outer diameter: 90 mm, length: 450 mm), thereby a coated film is formed. The polyamic acid composition (A-1) is coated on an outer peripheral surface excluding regions having a width of 20 mm from both ends of the cylindrical meta 1 mold (region having a width of 410 mm).

On the cylindrical metal mold used, in order to enable to readily peel a base material obtained by burning a coated film off the cylindrical metal mold, a fluorinated mold releasing agent is coated in advance on an outer peripheral surface thereof.

After the coated film is formed, the cylindrical metal mold is dried, while rotating, at 120° C. for 30 min. After drying, in a clean oven, the cylindrical metal mold is burned at 300° C. for 30 min to forward an imidization reaction. Thereafter, the cylindrical metal mold is cooled to room temperature (25° C.) and thereby a cylindrical base material is obtained.

—Surface Treatment of Base Material—

In the next place, the base material is peeled off the cylindrical metal mold and fastened to an outer peripheral surface of a cylindrical resin pipe having a size same as that of the cylindrical metal mold. Thereafter, so as to form a first region and a second region into a pattern (in the example, W1=20.0 mm, W2=20.0 mm and θ=45° are adopted) shown in FIG. 2A according to a surface treatment (hydrolysis treatment), on an outer peripheral surface of an obtained tubular base material, a PET mask tape having a width of 5 mm (material; PET (polyethylene terephthalate), manufactured by Nitto Denko Corporation) is adhered. Furthermore, upon hydrolyzing, in order to inhibit a processing liquid from intruding into a gap between an outer peripheral surface of a cylindrical resin pipe and an inner peripheral surface of a base material, a mask tape is adhered so as to straddle both of regions having a width of 5 mm from both end portions of an outer peripheral surface of a base material and an outer peripheral surface of a cylindrical resin pipe exposed along on both end portion sides of an outer peripheral surface of the base material.

Here, a portion of an outer peripheral surface of the base material, in which a mask tape is adhered and the surface treatment is not applied is taken a first region and a portion where a mask tape is not adhered and the surface treatment is applied is taken a second region.

A base material that is fastened, with a mask tape applied thereto, to an outer peripheral surface of a cylindrical resin pipe is dipped for 10 min in an aqueous solution of sodium hydroxide (concentration: 5% by weight) heated at 70° C. to hydrolyze. Subsequently, the base material is taken out of an aqueous solution of sodium hydroxide and washed with pure water. In the next place, the base material is dipped for 30 min in an aqueous solution of hydrochloric acid (concentration: 5% by weight) kept at 25° C., followed by taking out of an aqueous solution of hydrochloric acid, farther followed by washing with pure water.

At the last, a mask tape adhered to a surface of the base material is peeled, followed by drying in a dryer at 120° C. for 30 min, thereby an endless belt is obtained.

Example C2

In the surface treatment of the base material, a base material that is fastened, with a mask tape applied thereto, to an outer peripheral surface of a cylindrical resin pipe is dipped for 30 min in an aqueous solution of sodium hydroxide (concentration: 5% by weight) heated at 70° C. under the condition of treat in alkaline solution to hydrolyze, followed by taking out the base material out of an aqueous solution of sodium hydroxide, further followed by washing with pure water, still further followed by dipping the base material for 15 min in an aqueous solution of hydrochloric acid (concentration: 5% by weight) kept at 25° C., followed by taking out of the aqueous solution of hydrochloric acid, further followed by washing with pure water, similarly to example C1, a polyimide end less belt is obtained.

Example C3

Except that, in the surface treatment of a base material, a masking pattern formed on a base material surface is formed into a pattern shown in FIG. 2A (in the example, W1=20.0 mm, W2=80.0 mm and θ1=45° are adopted), similarly to example C1, a polyimide endless belt is obtained.

Example C4

Except that, in the surface treatment of a base material, a masking pattern formed on a base material surface is formed into a pattern shown in FIG. 2A (in the exemplary embodiment, W1=80.0 mm, W2=20.0 mm and θ1=45° are adopted), similarly to example C1, a polyimide endless belt is obtained.

Comparative Example C1

Except that a base material is not surface treated, similarly to example C1, an endless belt is obtained.

Comparative Example C2

In the surface treatment of a base material, a masking pattern formed on a base material surface is formed into a pattern shown in FIG. 2A (in the exemplary embodiment, W1=54.0 mm, W2=6.0 mm and θ1=45° are adopted).

In the surface treatment of the base material, a base material that is fastened, with a mask tape applied thereto, to an outer peripheral surface of a cylindrical resin pipe is dipped for 30 min in an aqueous solution of sodium hydroxide (concentration: 5% by weight) heated at 70° C. under the condition of treat in alkaline solution to hydrolyze, followed by taking out the base material out of an aqueous solution of sodium hydroxide, further followed by washing with pure water, still further followed by dipping the base material for 30 min in an aqueous solution of hydrochloric acid (concentration: 5% by weight) at 25° C., followed by taking out of the aqueous solution of hydrochloric acid, further followed by washing with pure water, similarly to example C1, a polyimide endless belt is obtained.

Comparative Example C3

In the surface treatment of a base material, a masking pattern formed on a base material surface is formed into a pattern shown in FIG. 2A (in the exemplary embodiment, W1=6.0 mm, W2=54.0 mm and θ1=45° are adopted).

In the surface treatment of the base material, a base material that is fastened, with a mask tape applied thereto, to an outer peripheral surface of a cylindrical resin pipe is dipped for 30 min in an aqueous solution of sodium hydroxide (concentration: 5% by weight) heated at 70° C. under the condition of treat in alkaline solution to hydrolyze, followed by taking out the base material out of an aqueous solution of sodium hydroxide, further followed by washing with pure water, still further followed by dipping the base material for 30 min in an aqueous solution of hydrochloric acid (concentration: 5% by weight) kept at 25° C., followed by taking out of the aqueous solution of hydrochloric acid, further followed by washing with pure water, similarly to example C1, a polyimide end less belt is obtained.

(Evaluation of Various Characteristics of Endless Belt)

Of resulted endless belts, similarly to the case shown in Tables 1 and 2, contact angles of the first and second regions, an imidization rate, ten-point average roughness Rz, a belt film thickness and the surface resistivity are measured. Results thereof are shown in Table 4 together with an area ratio of the first and second regions.

(Image Formation Test)

As an intermediate transfer belt of an image forming apparatus provided with an intermediate transfer belt (trade name: DOCUCENTRE II C4300, manufactured by Fuji Xerox Co., Ltd.)), each of endless belts obtained according to the respective examples and comparative examples is mounted.

Subsequently, with a primary transfer current, a secondary transfer current, a process speed and a fixing temperature, respectively, set at 20 μA, 20 μA, 50 mm/s and 150° C., by use of A4 size sheets (trade name: C2 PAPER, manufactured by Fuji Xerox Co., Ltd.), cyan and magenta halftone images (image density 50%) are formed under a high temperature and high humidity environment (28° C. and 85% RH) and a low temperature and low humidity environment (10° C. and 15% RH) respectively, and resulting images are evaluated of density unevenness and mottle defect.

Furthermore, after the tests, with plain A4 size sheets (trade name: C2 PAPER, manufactured by Fuji Xerox Co., Ltd.), the paper clogging test is carried out. Results are shown in Table 4.

TABLE 4

|  |  | Example C1 | Example C2 | Example C3 | Example C4 |
|---|---|---|---|---|---|
|  | Surface treatment | Hydrolysis | Hydrolysis | Hydrolysis | Hydrolysis |
| Contact angle (°) | Contact angle of first region θ(1) | 85 | 85 | 85 | 85 |
|  | Contact angle of second region θ(2) | 77 | 72 | 77 | 77 |
|  | \|θ(1) − θ(2)\| | 8 | 13 | 8 | 8 |
| Area ratio | First region:second region | 50:50 | 50:50 | 20:80 | 80:20 |
|  | Shapes and layout patterns of first and second regions | 2(A) W1 = 20.0 mm, W2 = 20.0 mm, θ1 = 45° | 2(A) W1 = 20.0 mm, W2 = 20.0 mm, θ1 = 45° | 2(A) W1 = 20.0 mm, W2 = 80.0 mm, θ1 = 45° | 2(A) W1 = 80.0 mm, W2 = 20.0 mm, θ1 = 45° |
| Imidization rate | First region:second region I(1) | 95 | 95 | 95 | 95 |
|  | Imidization rate of first region I(2) | 75 | 70 | 75 | 75 |
|  | \|I(1) − I(2)\| | 20 | 25 | 20 | 20 |
| Ten-point average roughness Rz (μm) | Rz(1) of first region | 0.55 | 0.55 | 0.55 | 0.55 |
|  | Rz(2) of second region | 0.55 | 0.55 | 0.55 | 0.55 |
|  | Rz(2)/Rz(1) | 1.00 | 1.00 | 1.00 | 1.00 |
| Belt film thickness (μm) | First region | 100 | 100 | 100 | 100 |
|  | Second region | 100 | 100 | 100 | 100 |
| Common logarithmic value of surface resistivity (Ω · cm) | Under application of 10 V | 11.0 | 11.0 | 11.0 | 11.0 |
|  | Under application of 100 V | 11.0 | 11.0 | 11.0 | 11.0 |
|  | Under application of 1000 V | 11.0 | 11.0 | 11.0 | 11.0 |
| Paper clogging | Low temperature and low humidity (10 C.° 15 RH %) | A | A | A | A |
|  | High temperature and high humidity (28 C.° 85 RH %) | A | A | A | A |
| Density unevenness | Low temperature and low humidity (10 C.° 15 RH %) | A | A | A | A |
|  | High temperature and high humidity (28 C.° 85 RH %) | A | A | A | A |
| Mottle defect | Low temperature and low humidity (10 C.° 15 RH %) | A | A | A | A |
|  | High temperature and high humidity (28 C.° 85 RH %) | A | A | A | A |

|  |  | Comparative Example C1 | Comparative Example C2 | Comparative Example C3 |
|---|---|---|---|---|
|  | Surface treatment | none | Hydrolysis | Hydrolysis |
| Contact angle (°) | Contact angle of first region θ(1) | 85 | 85 | 85 |
|  | Contact angle of second region θ(2) |  | 63 | 63 |
|  | \|θ(1) − θ(2)\| | — | 22 | 22 |
| Area ratio | First region:second region | — | 90:10 | 10:90 |
|  | Shapes and layout patterns of first and second regions | — | 2(A) W1 = 54.0 mm, W2 = 6.0 mm, θ1 = 45° | 2(A) W1 = 6.0 mm, W2 = 54.0 mm, θ1 = 45° |
| Imidization rate | First region:second region I(1) | 95 | 95 | 95 |
|  | Imidization rate of first region I(2) |  | 60 | 60 |
|  | \|I(1) − I(2)\| | — | 35 | 35 |

TABLE 4-continued

| | | | | |
|---|---|---|---|---|
| Ten-point average roughness Rz (μm) | Rz(1) of first region | 0.55 | 0.55 | 0.55 |
| | Rz(2) of second region | | 0.55 | 0.55 |
| | Rz(2)/Rz(1) | — | 1.00 | 1.00 |
| Belt film thickness (μm) | First region | 100 | 100 | 100 |
| | Second region | | 100 | 100 |
| Common logarithmic value of surface resistivity (Ω · cm) | Under application of 10 V | 11.0 | 11.0 | 11.0 |
| | Under application of 100 V | 11.0 | 11.0 | 11.0 |
| | Under application of 1000 V | 11.0 | 11.0 | 11.0 |
| Paper clogging | Low temperature and low humidity (10 C.° 15 RH %) | D | D | D |
| | High temperature and high humidity (28 C.° 85 RH %) | B | B | B |
| Density unevenness | Low temperature and low humidity (10 C.° 15 RH %) | A | A | A |
| | High temperature and high humidity (28 C.° 85 RH %) | A | A | A |
| Mottle defect | Low temperature and low humidity (10 C.° 15 RH %) | A | A | A |
| | High temperature and high humidity (28 C.° 85 RH %) | A | A | A |

In Table 4, the evaluation methods and evaluation criteria of the density unevenness and mottle defect are same as that mentioned above. Furthermore, the evaluation method and evaluation criteria of the paper clogging are as follows.

—Paper Clogging—

Here, 10000 sheets of white A4 size sheets (trade name: C2 PAPER, manufactured by Fuji Xerox Co., Ltd.) are continuously passed at a primary transfer current of 20 μA, a secondary transfer current of 20 μA, a process speed of 50 mm/s and a fixing temperature of 150° C., and the number of clogged sheets at an intermediate transfer belt position in the continuous pass test is counted. The test is carried out under a high temperature and high humidity environment (28° C. and 85% RH) and a low temperature and low humidity environment (10° C. and 15% RH), respectively.

A: The number of clogged paper is less than 5
B: The number of clogged paper is 5 or more and less than 10
C: The number of clogged paper is 10 or more and less than 20
D: The number of clogged paper is 20 or more According to an exemplary embodiment of the present invention, even under a low temperature and low humidity environment, an endless belt having excellent peelability to a recording medium may be provided.

According to an another exemplary embodiment of the present invention, when an endless belt of the invention is used as a transfer delivery belt, an endless belt that may obtain the peelability more excellent to a recording medium may be provided.

According to an another exemplary embodiment of the present invention, when an endless belt of the invention is used as a fixing belt, an endless belt that may obtain the peelability more excellent to a recording medium may be provided.

According to an another exemplary embodiment of the present invention, when an endless belt of the invention is used as a fixing belt, the pressing pressure against a recording medium becomes uniform to be difficult to cause the fixing defect, and, when an endless belt is used as an intermediate transfer belt, a toner may be inhibited from causing the transfer defect; accordingly, an endless belt that combines more excellent peelability of a recording medium and the driving stability may be provided.

According to an another exemplary embodiment of the present invention, an endless belt having the contact angle difference necessary for securing the peelability to a recording medium between a first region and a second region may be provided.

According to an another exemplary embodiment of the present invention, a method of producing an endless belt having the peelability excellent to a recording medium even under a low temperature and low humidity environment may be provided.

According to an another exemplary embodiment of the present invention, an image forming apparatus that may inhibit the paper clogging from occurring even under a low temperature and low humidity environment at a position where an intermediate transfer belt is disposed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if such individual publication, patent application, or technical standard was specifically and individually indicated to be incorporated by reference.

What is claimed is:

1. An endless belt, comprising:
a first region and a second region, each of which contain a polyimide-based resin, a contact angle to water of an outer peripheral surface of each of the first region and the second region differing from each other, a ratio of a sum total of an area of the first region and a sum total of an area of the second region being in the range of about 60:40, to about 40:60.

2. The endless belt of claim 1, wherein an absolute value of a difference of the contact angle to water of the first region and the contact angle to water of the second region is about 10° or more.

3. The endless belt of claim 1, wherein an absolute value of a difference of the contact angle to water of the first region and the contact angle to water of the second region is about 20° or more.

4. An image forming apparatus, comprising:
one or more endless belts mounted thereon, wherein at least one of the one or more endless belts is the endless belt of claim 3.

5. The image forming apparatus of claim 4, wherein at least one of the one or more endless belts is an intermediate transfer belt comprising the endless belt.

6. The image forming apparatus of claim 4, wherein at least one of the one or more endless belts is a transfer delivery belt comprising the endless belt.

7. The image forming apparatus of claim 4, wherein at least one of the one or more endless belts is a fixing belt comprising the endless belt.

8. The endless belt of claim 1, wherein a ratio of a ten-point average roughness Rz of the second region with respect to a ten-point average roughness Rz of the first region is in the range of from about 0.8 to about 1.2.

9. The endless belt of claim 1, wherein an imidization rate of the first region and an imidization rate of the second region satisfy formula (1) below: •Formula (1)| imidization rate of the first region−imidization rate of the second region|≧20 wherein, in formula (1), the imidization rate means a value shown by formula (2) below, •Formula (2) imidization rate={(Abs(C=O))/(Abs(Ar))}/k×100 wherein, formula (2), Abs (C=O) expresses the absorbance of a peak appearing at 1700 $cm^{-1}$ to 1850 $cm^{-1}$ and caused by a carbonyl group derived from an imide group that constitutes the polyimide-based resin, Abs (Ar) expresses the absorbance of a peak appearing at 1400 $cm^{-1}$ to 1600 $cm^{-1}$ and caused by a benzene ring that constitutes the polyimide-based resin, and k expresses a constant value (a value of Abs (C=O)/Abs (Ar) of a film obtained by burning a polyimide resin film to be used at 400° C.).

10. An image forming apparatus, comprising:
one or more endless belts mounted thereon, wherein at least one of the one or more endless belts is the endless belt of claim 9.

11. The image forming apparatus of claim 10, wherein at least one of the one or more endless belts is an intermediate transfer belt comprising the endless belt.

12. The image forming apparatus of claim 10, wherein at least one of the one or more endless belts is a transfer delivery belt comprising the endless belt.

13. The image forming apparatus of claim 10, wherein at least one of the one or more endless belts is a fixing belt comprising the endless belt.

14. An image forming apparatus, comprising:
one or more endless belts mounted thereon, wherein at least one of the one or more endless belts is the endless belt of claim 1.

15. The image forming apparatus of claim 14, wherein at least one of the one or more endless belts is an intermediate transfer belt comprising the endless belt.

16. The image forming apparatus of claim 14, wherein at least one of the one or more endless belts is a transfer delivery belt comprising the endless belt.

17. The image forming apparatus of claim 14, wherein at least one of the one or more endless belts is a fixing belt comprising the endless belt.

* * * * *